(12) United States Patent
Lee et al.

(10) Patent No.: US 7,166,987 B2
(45) Date of Patent: Jan. 23, 2007

(54) PORTABLE CHARGER FOR MOBILE PHONE

(75) Inventors: Kyung-Sang Lee, Suwon (KR); Jung-Woo Lee, Inchon (KR); Moon-Young Chai, Youngin (KR)

(73) Assignee: R. F. Tech Co., Ltd (KR)

( * ) Notice: Subject to any disclaimer, the term of this patent is extended or adjusted under 35 U.S.C. 154(b) by 318 days.

(21) Appl. No.: 10/959,011

(22) Filed: Oct. 5, 2004

(65) Prior Publication Data

US 2005/0088141 A1   Apr. 28, 2005

(30) Foreign Application Priority Data

Oct. 10, 2003   (KR) .................... 10-2003-0070665
Oct. 10, 2003   (KR) .................... 10-2003-0070666

(51) Int. Cl.
  *H02J 7/00*   (2006.01)
  *B65D 85/00*  (2006.01)

(52) U.S. Cl. ...................... 320/114; 206/703

(58) Field of Classification Search ........ 320/107–115; 206/701–704; 224/902
See application file for complete search history.

(56) References Cited

U.S. PATENT DOCUMENTS

| 6,184,654 B1* | 2/2001 | Bachner et al. ............ 320/114 |
| 6,643,528 B1* | 11/2003 | Shim et al. ............. 455/575.2 |
| 2004/0069821 A1* | 4/2004 | Kobayashi ................ 224/269 |

* cited by examiner

*Primary Examiner*—Karl Easthom
*Assistant Examiner*—Richard V. Muralidar
(74) *Attorney, Agent, or Firm*—Seth Natter; Natter & Natter

(57) ABSTRACT

Disclosed herein is a portable charger for a mobile phone. The portable charger includes a front housing, a rear housing, a belt clip, a fastening unit, a pair of clamps, a release button, an interface connector, a secondary battery and a charge control unit. The portable charger is easy to carry, can easily charge the battery of the mobile phone with direct current power charged in a secondary battery, and can simultaneously charge the secondary battery and the battery of the mobile phone using a travel adaptor.

12 Claims, 16 Drawing Sheets

PORTABLE CHARGER FOR MOBILE PHONE

BACKGROUND OF THE INVENTION

1. Field of the Invention

The present invention relates generally to a portable charger for a mobile phone (also referred to as a mobile communication terminal or a portable phone) and, more particularly, to a portable charger for a mobile phone, which is easy to carry, can easily charge the battery of the mobile phone with direct current power charged in a secondary battery, and can simultaneously charge the secondary battery and the battery of the mobile phone using a travel adaptor.

2. Description of the Related Art

A conventional portable charger equipped with an internal battery is disclosed in Korean Utility Model Registration No. 20-0275514 (registered on May 1, 2002).

In the portable charger equipped with an internal battery, which is disclosed in Korean Utility Model Registration. No. 20-0275514, an Alternating Current (AC) power connection unit 110 provided with a power plug 111 is attached to a side of a body 100 to allow the portable charger to be connected to a domestic power outlet, as shown in FIGS. 1 and 2.

The power plug 111 can be retracted to a position parallel to the body 100 using a rotation shaft 112 provided on the body 100, so that it is secured in a position perpendicular to the body 100 when in use (indicated by dotted lines), and is retracted into a recess 113 when not in use (indicated by solid lines).

A cable 151 and an interface jack 152 are provided on a side of the body 100 to allow the charger to be electrically connected to the interface connector (not shown) of a mobile phone. The internal terminals of the interface connector of the mobile phone are electrically connected to the positive (+) terminal, negative (−) terminal and identification data input (IN) terminal of an external battery connection unit 115.

As shown in FIG. 2, the charger is electrically connected to domestic 110V or 220V AC power through the AC power connection unit 110. An ElectroMagnetic Interference (EMI) filter 121 is connected to the AC power connection unit 110 to remove noise from AC power that is applied through the AC power connection unit 110. A rectifying unit 122 is connected to the EMI filter 121 to rectify the AC power, applied through the EMI filter 121, to Direct Current (DC) power and supply the DC power to a switching mode power supply unit 114.

The switching mode power supply unit 114 functions to receive the DC current from the rectifying unit, interrupt the DC current according to a duty ratio, and supply stepped-down charging current. The switching mode power supply unit 114 includes a coil unit 114a for producing the stepped-down current by interrupting the DC current input from the rectifying unit 122, and a switching control unit 114b for adjusting the amount of charging current flowing into the secondary battery by switching the coil unit 114a.

The external battery connection unit 115 is connected to the interface connector of the mobile phone so that identification data (ID) transmitted from the battery identification terminal of the mobile phone is applied to a microprocessor 119 through an identification output terminal OUT. The interface jack 152 is provided with the positive (+) input terminal, the negative (−) input terminal and the identification data input (IN) terminal that are connected to the charging terminal, ground terminal and identification terminal of the battery of the mobile phone, respectively.

In FIG. 2, a Pulse Width Modulation (PWM) control unit 116 adjusts the voltage level of current charging voltage based on a voltage control signal applied from the microprocessor 119 so that charging voltage applied to the external battery connection unit 115 reaches a specific reference voltage and is maintained at the specific reference voltage. The modulation signal output terminal of the PWM control unit 116 is connected to the base terminal of a transistor Q1, the output terminal of the switching mode power supply unit 114 is connected to the collector terminal of the transistor Q1, and the charging current input terminal of the external battery connection unit 115 as well as the voltage feedback signal input terminal of the PWM control unit 116 are connected to the emitter terminal of the transistor Q1.

An internal battery 117 connected to the output terminal of the switching mode power supply unit 114 is a secondary battery that stores electrical energy using DC power, output from the switching mode power supply unit 114, as charging current. The internal battery 117 is charged with electricity to charge an external battery (battery of a mobile phone) that is connected to the external battery connection unit 115.

The internal battery 117 is equipped with an overcharge prevention circuit to prevent overcharge. A photocoupler 118 is connected between the microprocessor 119 and the switching control unit 114b of the switching mode power supply unit 114 to convert a current control signal, applied by the microprocessor 119, into an optical signal, to convert the optical signal into an electrical signal having a specific duty ratio and to control the application of power to the switching mode power supply unit 114.

In the above case, when the battery of a mobile phone is connected to the external battery connection unit 115, the microprocessor 119 reads the identification data of the battery transmitted from the external battery connection unit 115, sets the maximum charging voltage and maximum charging current, and controls the switching mode power supply unit 114 and the PWM control unit 116 based on the maximum charging voltage and the maximum charging current.

In the case where a user charges the battery of a mobile phone with domestic 110V or 220V AC power, the user inserts the power plug 111 of the AC power connection unit 120 into a domestic power outlet and connects the interface jack 152 to the interface connector (not shown) of the mobile phone.

While the AC power flowing through the AC power connection unit 110 passes through the EMI filter 121, noise is filtered out from the AC power. The noise-free AC power is rectified to DC power by the rectifying unit 122, and the DC power is applied to the switching mode power supply unit 114.

The DC power applied to the switching mode power supply unit 114 is used to charge the battery of the mobile phone and the internal battery 117 under the control of the microprocessor 119.

After applying a current control signal, that is, a PWM modulation signal, to the photocoupler 118 based on the preset maximum charging voltage and charging current of the internal battery 117, the microprocessor 119 reads the identification data (ID) of the mobile phone transmitted from the external battery connection unit 115, sets the maximum charging voltage and maximum charging current for the battery of the mobile phone, and sets the reference voltage of the PWM control unit 116 to the maximum charging voltage of the battery of the mobile phone.

The photocoupler 118 outputs an electrical signal having a specific duty ratio to the switching control unit 114b to correspond to the current control signal transmitted from the microprocessor 119. The switching control unit 114*b* adjusts the amount of charging current, which will be supplied to the external battery connection unit 115 and the internal battery 117, by interrupting the operation of the coil unit 114*a* according to the duty ratio of the electrical signal.

The PWM control unit 116 compares the voltage (current charged voltage of the battery of the mobile phone), applied to the emitter terminal of the transistor Q1 and the connection node of the external battery connection unit 115, with the preset reference voltage, and adjusts the period of ON/OFF operation of the transistor Q1 so that the current charged voltage reaches the preset reference voltage and is maintained at the preset reference voltage.

When the current charged voltage reaches the reference voltage, the PWM control unit 116 indicates to the microprocessor 119 that current charged voltage has reached the reference voltage. The microprocessor 119 applies a current control signal to the photocoupler 118 in response to the information so that the amount of charging current output from the switching mode power supply unit 114 gradually decreases.

That is, the microprocessor 119 controls the operation of the switching mode power supply unit 114 according to the preset maximum charging voltage and current for the internal battery 117. Furthermore, the microprocessor 119 prevents overcharge of the battery connected to the external battery connection unit 115 by adjusting the amount of charging current that is output from the switching mode power supply unit 114 based on the current charged voltage of the mobile phone. When the internal battery 117 reaches a fully charged state, the microprocessor 119 detects the fully charged state using the overcharge prevention circuit and automatically blocks the inflow of charging current.

According to the above-described operation, the charging current output from the switching mode power supply unit 114 charges the internal battery 117 through a diode D1, and is applied to the external battery connection unit 115 and charges the battery of the mobile phone as well.

An operation of charging the battery of a mobile phone with charging power charged in the internal battery 117 is described below.

When the interface jack 152 of FIG. 1 is connected to the interface connector of the mobile phone in the case where the internal battery 117 has been charged through the above-described operation and the mobile phone must be charged at a location where domestic AC power is not available, part of the charging power is supplied through an operating power supply circuit as operating power.

At this time, the microprocessor 119 reads the identification data (ID) of the battery of the mobile phone transmitted from the external battery connection unit 115, sets the maximum charging voltage and current of the battery of the mobile phone, and sets the reference voltage of the PWM control unit 116 to the maximum charging voltage.

The PWM control unit 116 charges the battery of the mobile phone by comparing the current charged voltage of the battery of the mobile phone, connected to the external battery connection unit 115, with the preset reference voltage, and adjusting the period of ON/OFF operation of the transistor Q1 so that the current charged voltage reaches the preset reference voltage and is maintained at the preset reference voltage.

Although the conventional portable charger equipped with an internal battery is capable of charging the battery of a mobile phone even at locations where domestic AC power and automobile battery power are not available, the conventional charger is disadvantageous in that the conventional charger is not possible and the charging operation of the conventional charger is complicated and inconvenient because the cable 152, provided with the interface jack 152 that will be connected to the interface connector of a mobile phone, is required to charge the battery of the mobile phone and one end of the cable 152 must be electrically connected to the body 100.

SUMMARY OF THE INVENTION

Accordingly, the present invention has been made keeping in mind the above problems occurring in the prior art, and an object of the present invention is to provide a portable charger for a mobile phone that is easy to carry because it can be easily attached to and detached from a waist belt using a belt clip and the wearing position of the portable charger for a mobile phone can be changed through the rotation thereof when being worn on a waist belt.

Another object of the present invention is to provide a portable charger for a mobile phone, which can simultaneously charge a secondary battery and the battery of a mobile phone with the DC power obtained by a travel adaptor.

Still another object of the present invention is to provide a portable charger for a mobile phone, which can prevent charging power from being discharged from a secondary battery when the mobile phone is not electrically connected to the accommodation recess of the front housing of the portable charger for a mobile phone.

Still another object of the present invention is to provide a portable charger for a mobile phone, which prevents charge when the surrounding temperature is equal to or higher than a predetermined temperature (for example, 45° C.) or equal to or lower than a predetermined temperature (for example, −5° C.).

Still another object of the present invention is to provide a portable charger for a mobile phone, which can easily charge the battery of a mobile phone with the DC power charged in the secondary battery.

Still another object of the present invention is to provide a portable charger for a mobile phone, which can easily charge the battery of a mobile phone using an automobile battery while connecting to a hands-free kit.

Still another object of the present invention is to provide a portable charger for a mobile phone, which can simultaneously charge a secondary battery and the battery of a mobile phone using a travel adaptor while electrically connecting to a table charging stand.

In order to accomplish the above object, the present invention provides a portable charger for a mobile phone, including a front housing having an accommodation recess formed in the front side of the front housing to accommodate a mobile phone, and cutouts formed on the right and left sides of the upper portion of the accommodation recess to allow a user to easily grip the mobile phone seated in the accommodation recess and easily manipulate a volume key of the mobile phone; a rear housing fastened to the back of the front housing by screws to close the rear open side of the front housing; a belt clip detachably attached into a long accommodation recess formed on the back of the rear housing to change the mounting position of the rear housing; a fastening unit placed in the long accommodation recess formed on the back of the rear housing to prevent the belt clip from being removed from the accommodation recess; a pair of clamps rotatably placed on the right and left sidewalls of the accommodation recess formed in the front housing to prevent the mobile phone from being removed during charging while engaging with recesses formed on both sides of the mobile phone, respectively; a release button placed above a location between the front housing and the rear housing to regulate protrusion and retraction of projections of the clamps; an interface connector mounted in the lower portion of the accommodation recess, formed in the front housing, through a shaft and a coil spring to be rotated in a block; a secondary battery placed in a space formed by the front and rear housings; and a charge control unit configured to perform control so that Direct Current (DC) voltage, converted by a travel adaptor, is received through a cord and a connector and the second battery and the battery of the mobile phone are simultaneously charged with the DC voltage, or the battery of the mobile phone is charged with DC voltage charged in the secondary battery.

Additionally, the present invention provides a portable charger for a mobile phone, including a front housing having an accommodation recess formed in the front side of the front housing to accommodate a mobile phone, and cutouts formed on the right and left sides of an upper portion of the accommodation recess to allow a user to easily grip the mobile phone seated in the accommodation recess and easily manipulate a volume key of the mobile phone; a rear housing fastened to the back of the front housing by screws to close the rear open side of the front housing; a belt clip detachably attached into a long accommodation recess formed on the back of the rear housing to change the mounting position of the rear housing; a fastening unit placed in the long accommodation recess formed on the back of the rear housing to prevent the belt clip from being removed from the accommodation recess; a pair of clamps rotatably placed on the right and left sidewalls of the accommodation recess formed in the front housing to prevent the mobile phone from being removed during charging while engaging with recesses formed on both sides of the mobile phone, respectively; a release button placed above a location between the front housing and the rear housing to regulate protrusion and retraction of projections of the clamps; an interface connector mounted in the lower portion of the accommodation recess, formed in the front housing, through a shaft and a coil spring to be rotated in a block; and a secondary battery placed in a space formed by the front and rear housings to be charged with DC voltage, obtained by a travel adaptor, under the control of a charge control unit.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
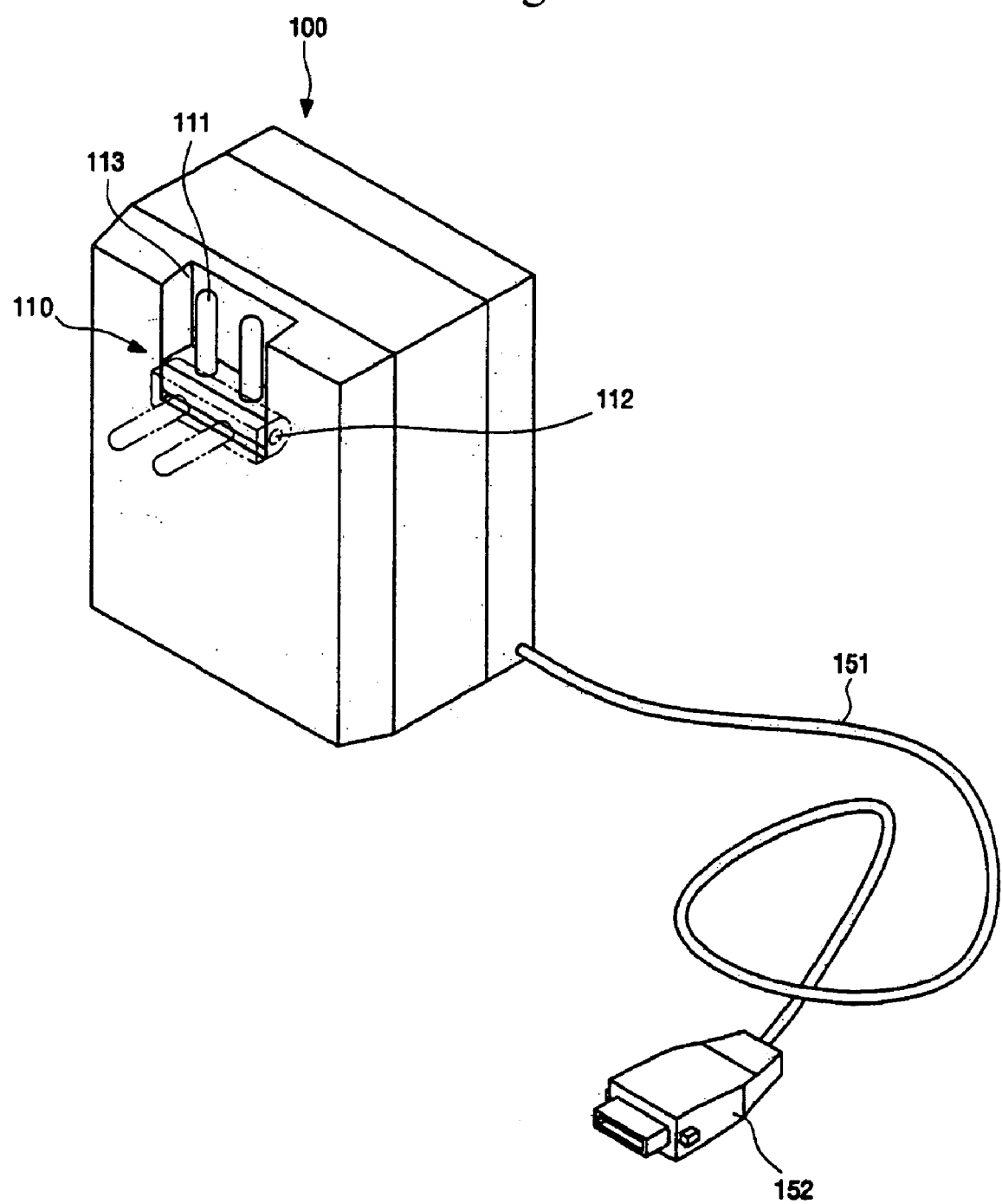
FIG. 1 is a schematic perspective view showing a conventional portable charger that is equipped with a secondary battery.
Figure 2:
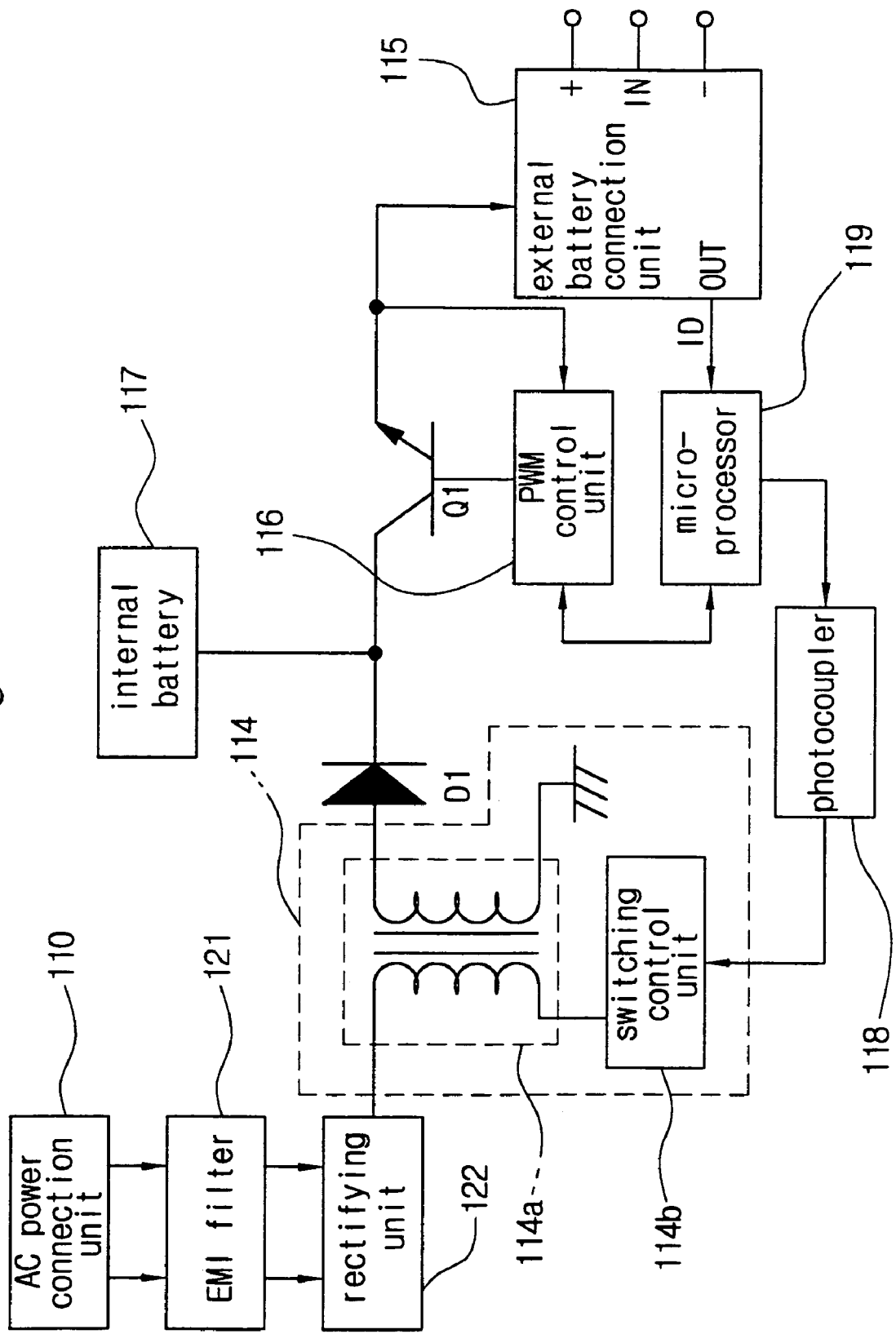
FIG. 2 is a block diagram showing the control circuit of the conventional portable charger.

Reference now should be made to the drawings, in which the same reference numerals are used throughout the different drawings to designate the same or similar components.

Figure 3:
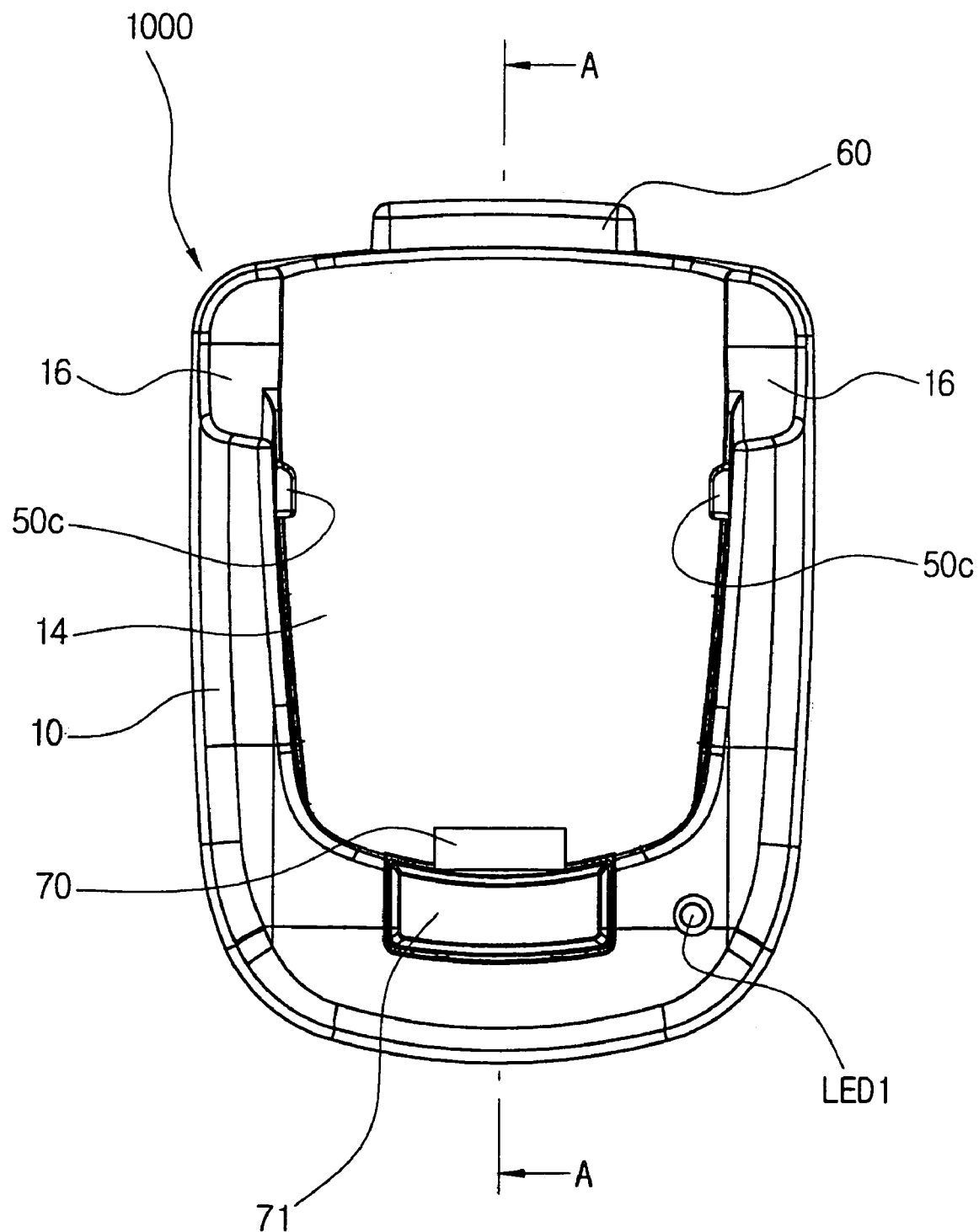
FIG. 3 is a front view schematically showing a portable charger for a mobile phone according to an embodiment of the present invention.
Figure 4:
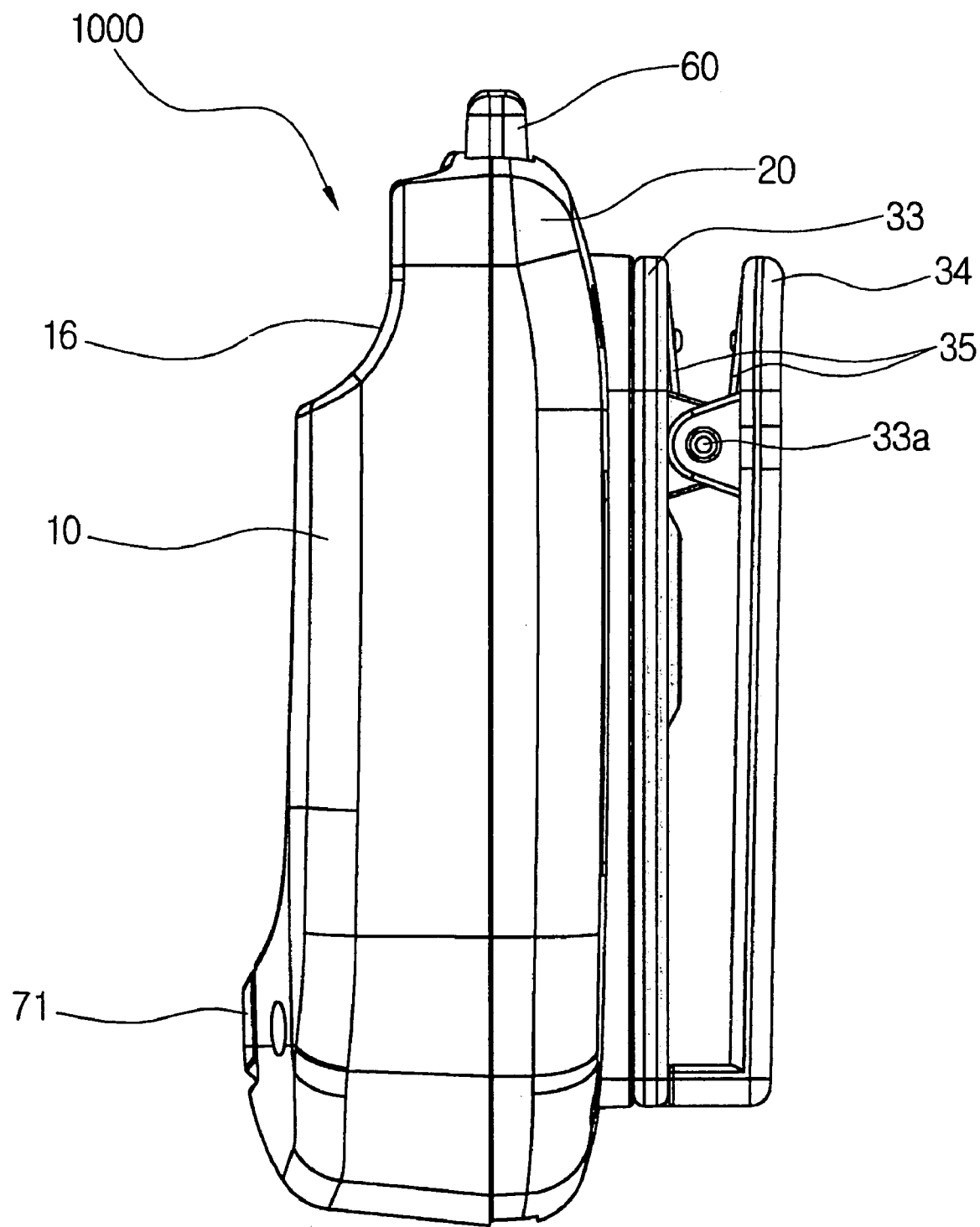
FIG. 4 is a right side view showing the portable charger for a mobile phone with a belt clip in a non-operational position.
Figure 5:
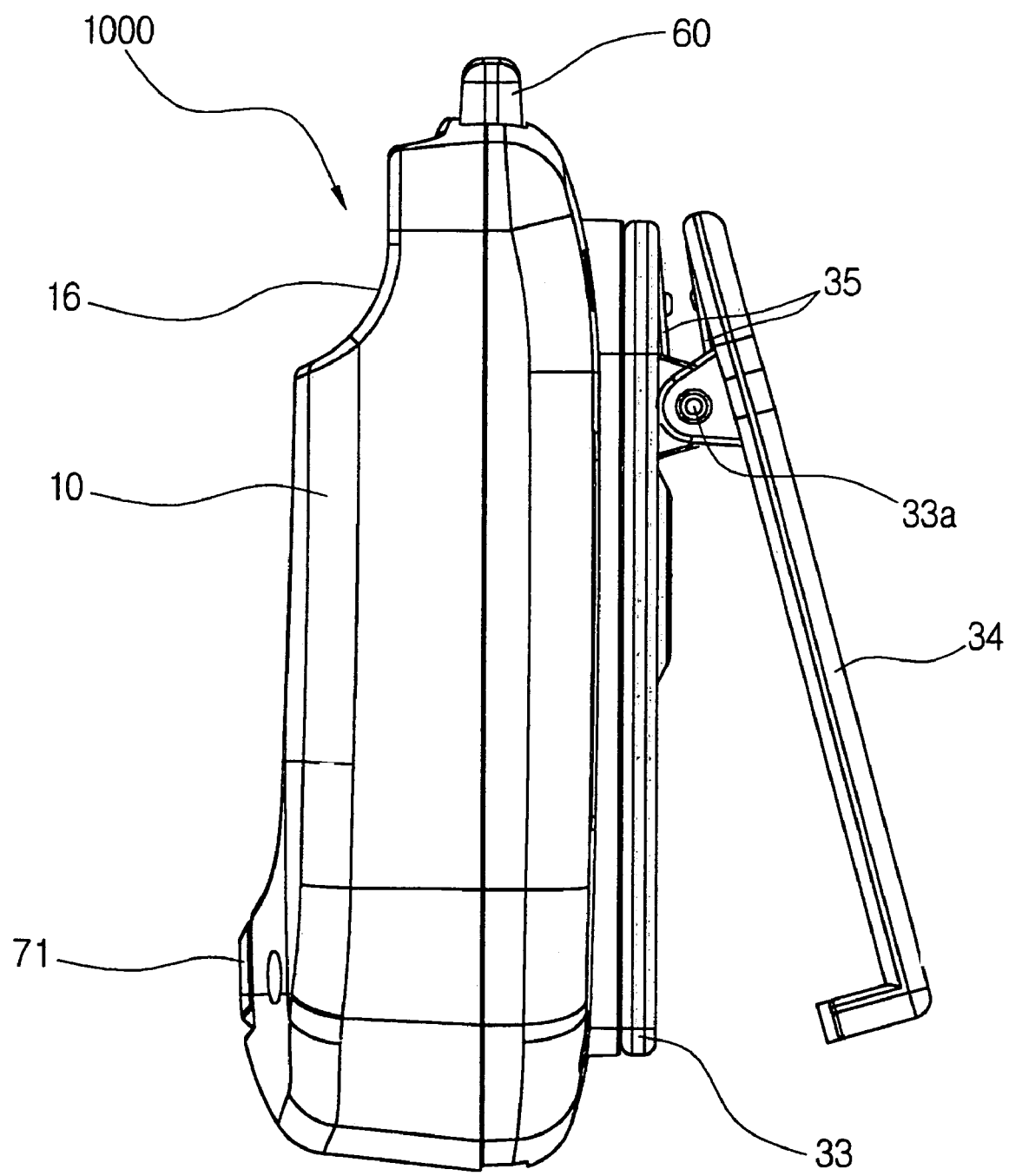
FIG. 5 is a right side view showing the portable charger for a mobile phone with the belt clip in an operational position.
Figure 6:
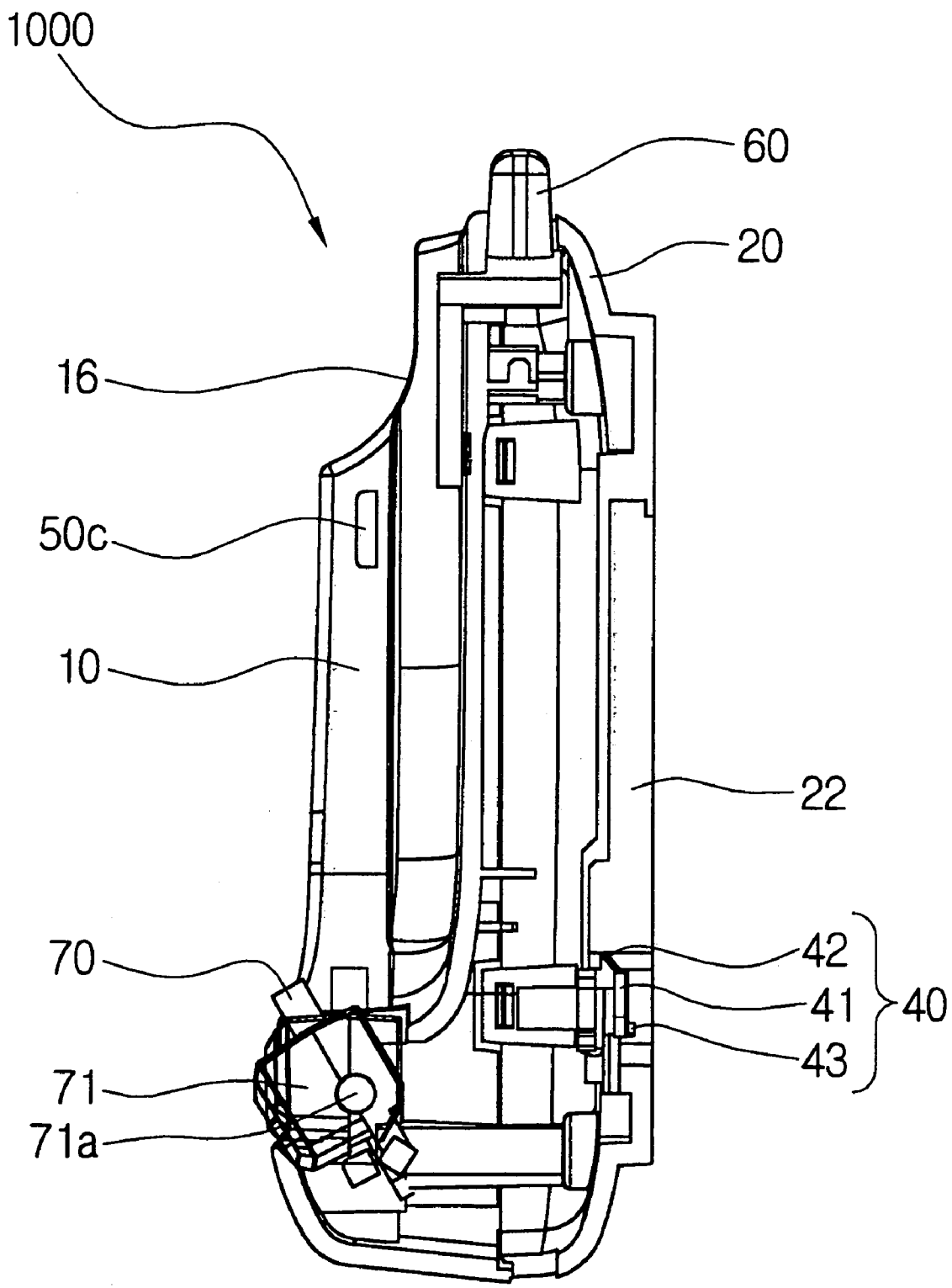
FIG. 6 is a longitudinal section taken along line A—A of FIG. 3 with a secondary battery and a charge control circuit removed therefrom.
Figure 7:
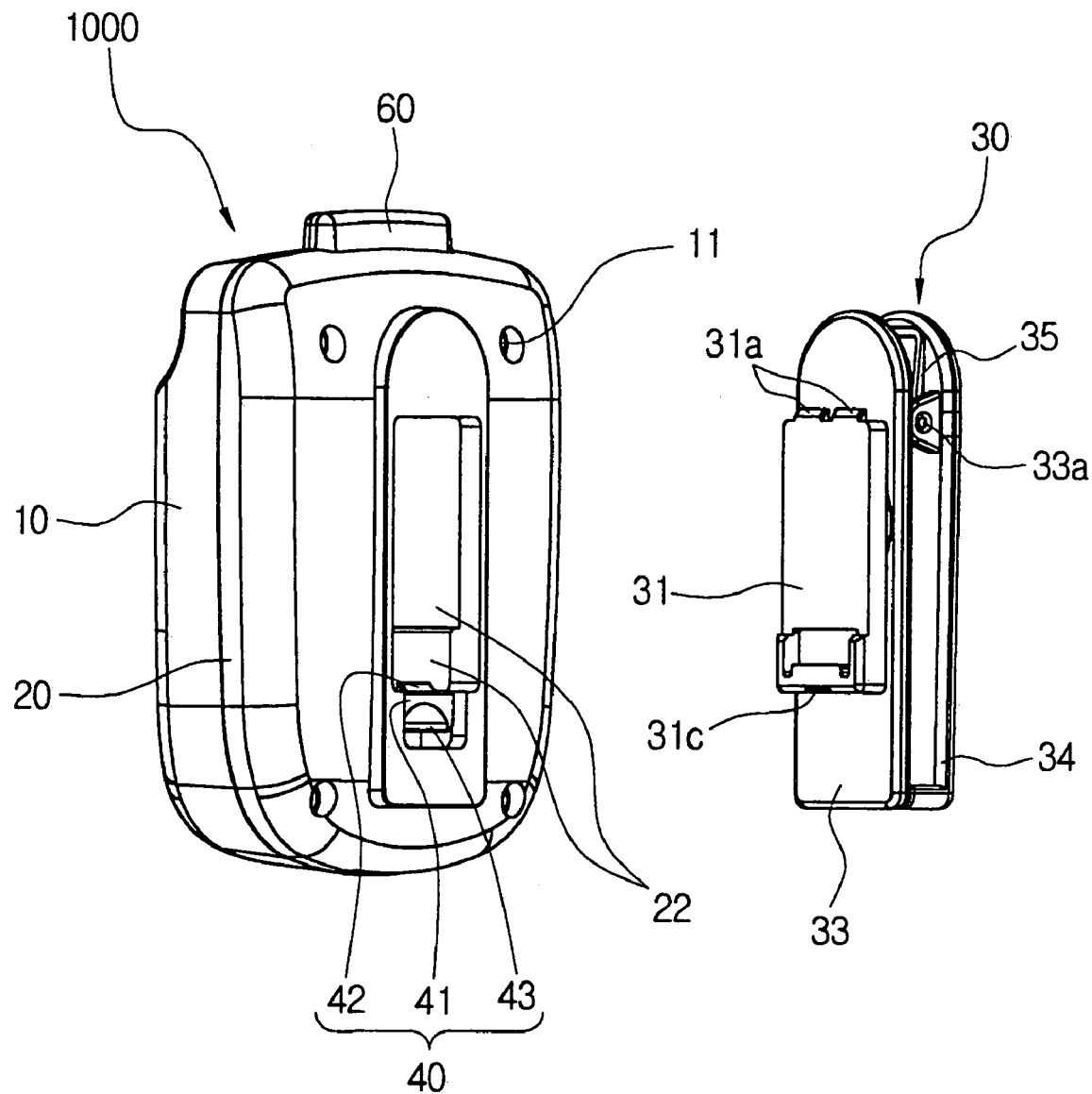
FIG. 7 is a rearward perspective view showing the portable charger for a mobile phone with the belt clip separated therefrom.
Figure 8:
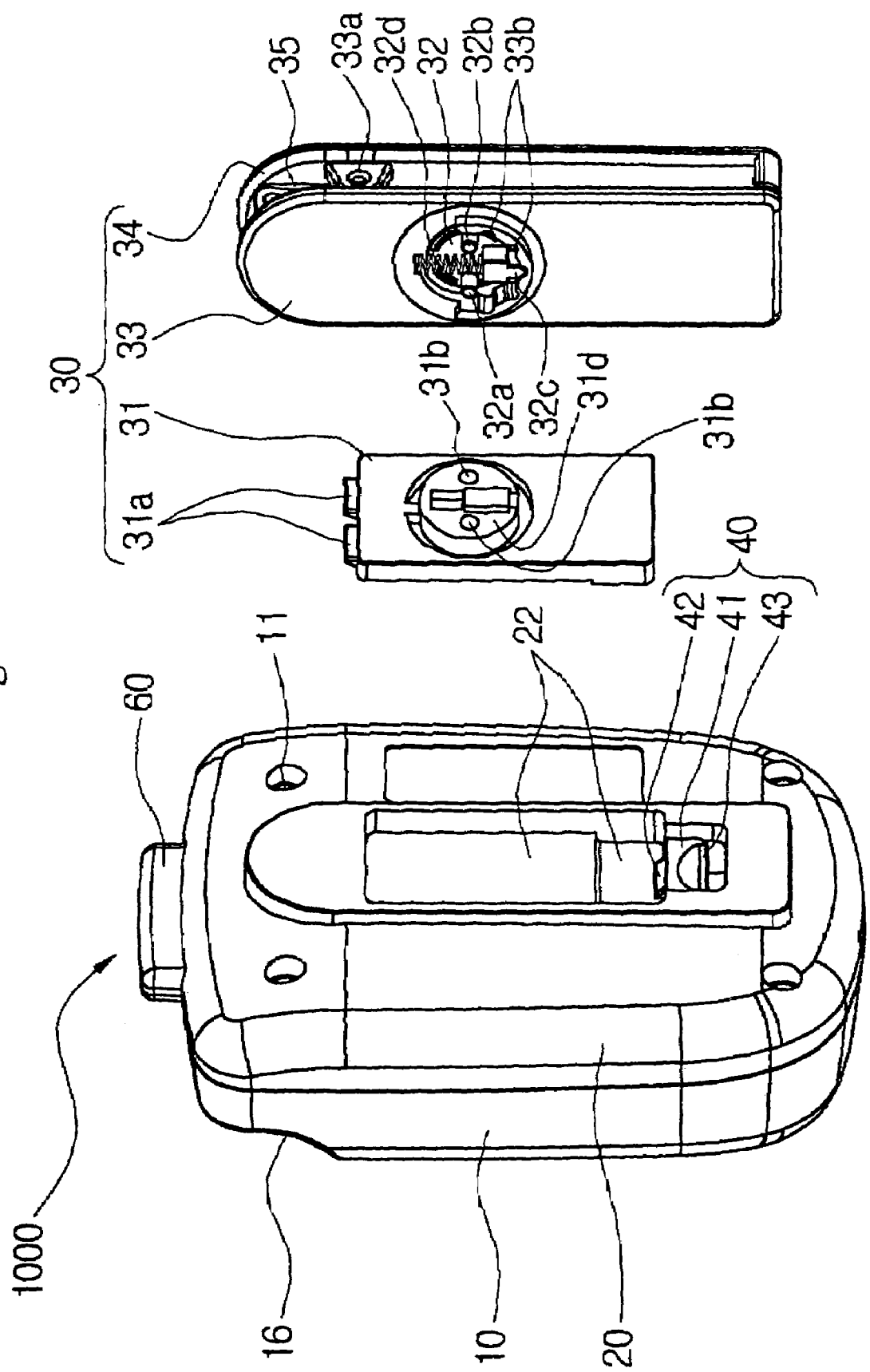
FIG. 8 is a rearward perspective view showing the portable charger for a mobile phone with a coupling member is separated from the fastening member of the belt clip.
Figure 9:
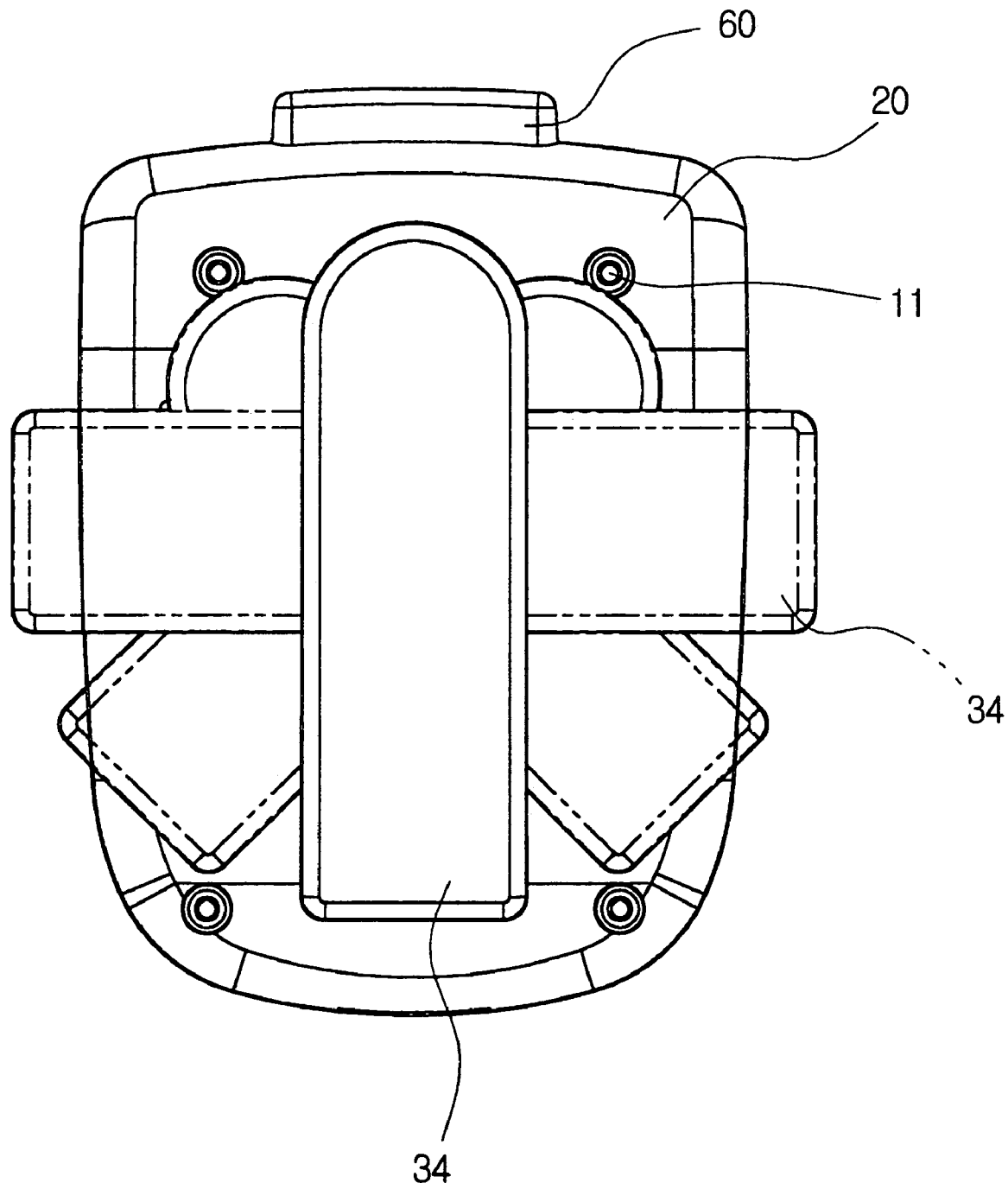
FIG. 9 is a view showing the coupling member rotated by 90° clockwise and counterclockwise around the fastening member of the belt clip in the portable charger for a mobile phone according to the embodiment of the present invention.
Figure 10:
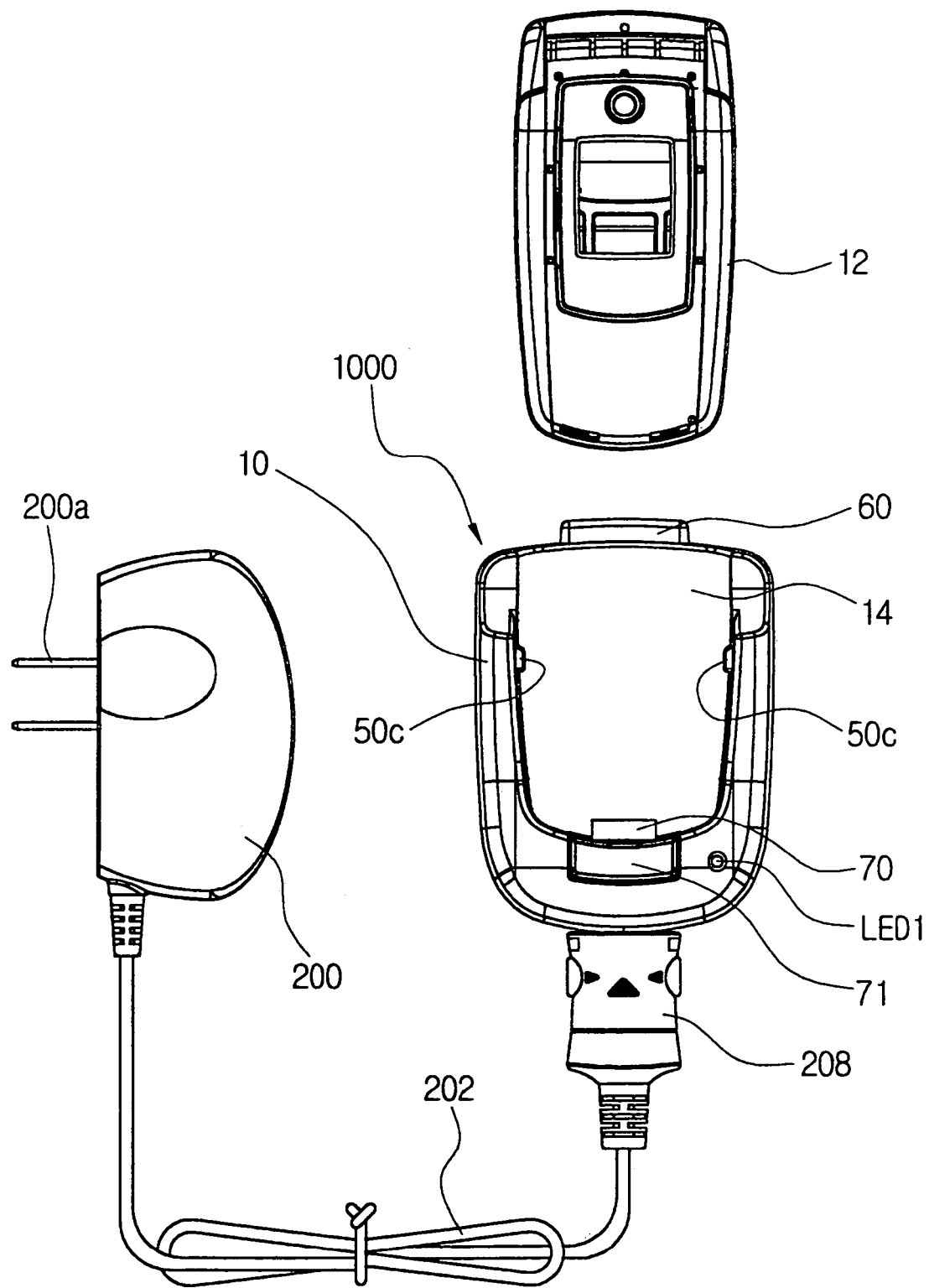
FIG. 10 is a view showing the electrical connection of a charging cable to the portable charger for a mobile phone according to the embodiment of the present invention and the mounting of a mobile phone in the portable charger for a mobile phone according to the embodiment of the present invention.
Figure 11:
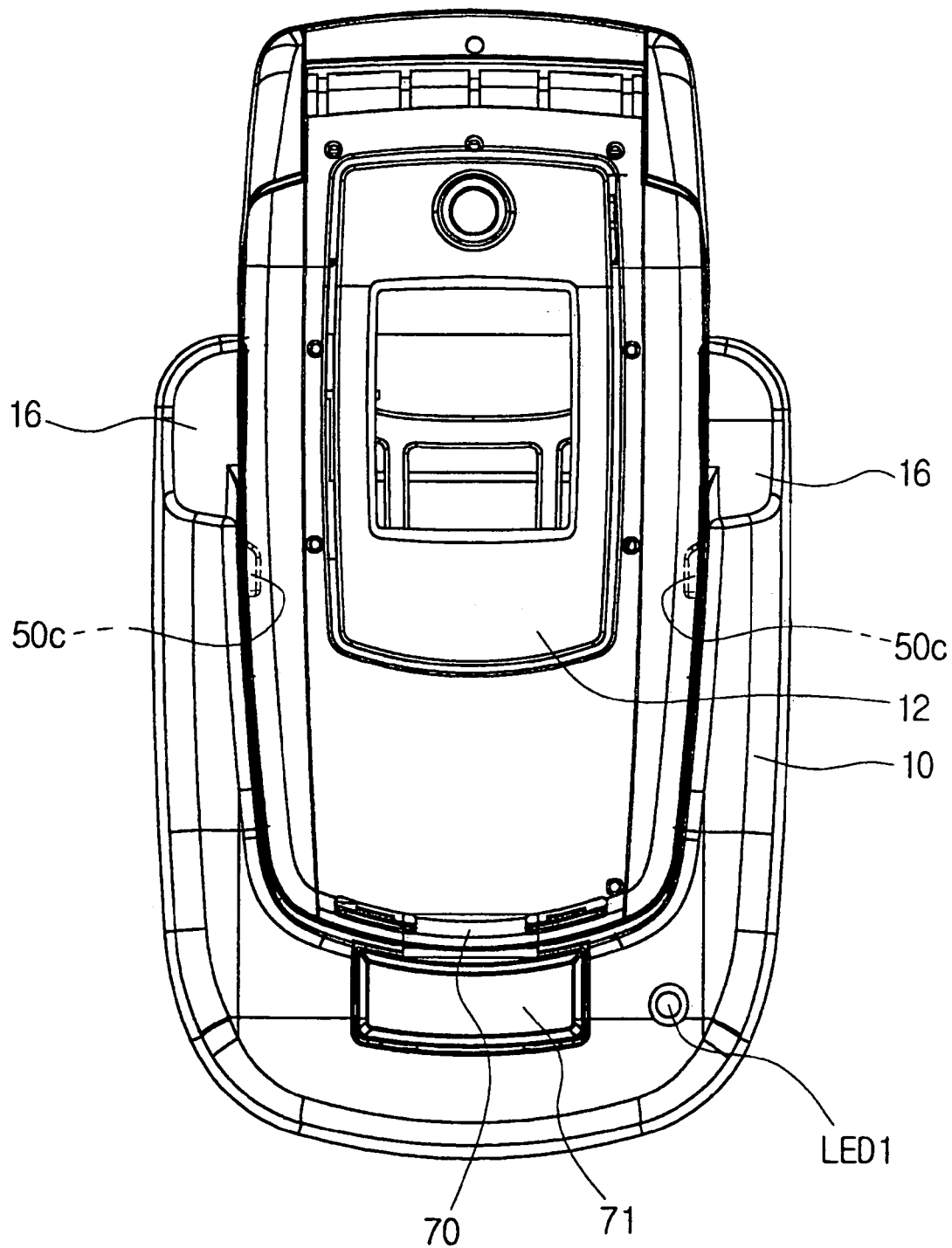
FIG. 11 is a view showing the mounting of a mobile phone in the portable charger for a mobile phone according to the embodiment of the present invention and the charging of the battery of the mobile phone using the secondary battery.
Figure 12:
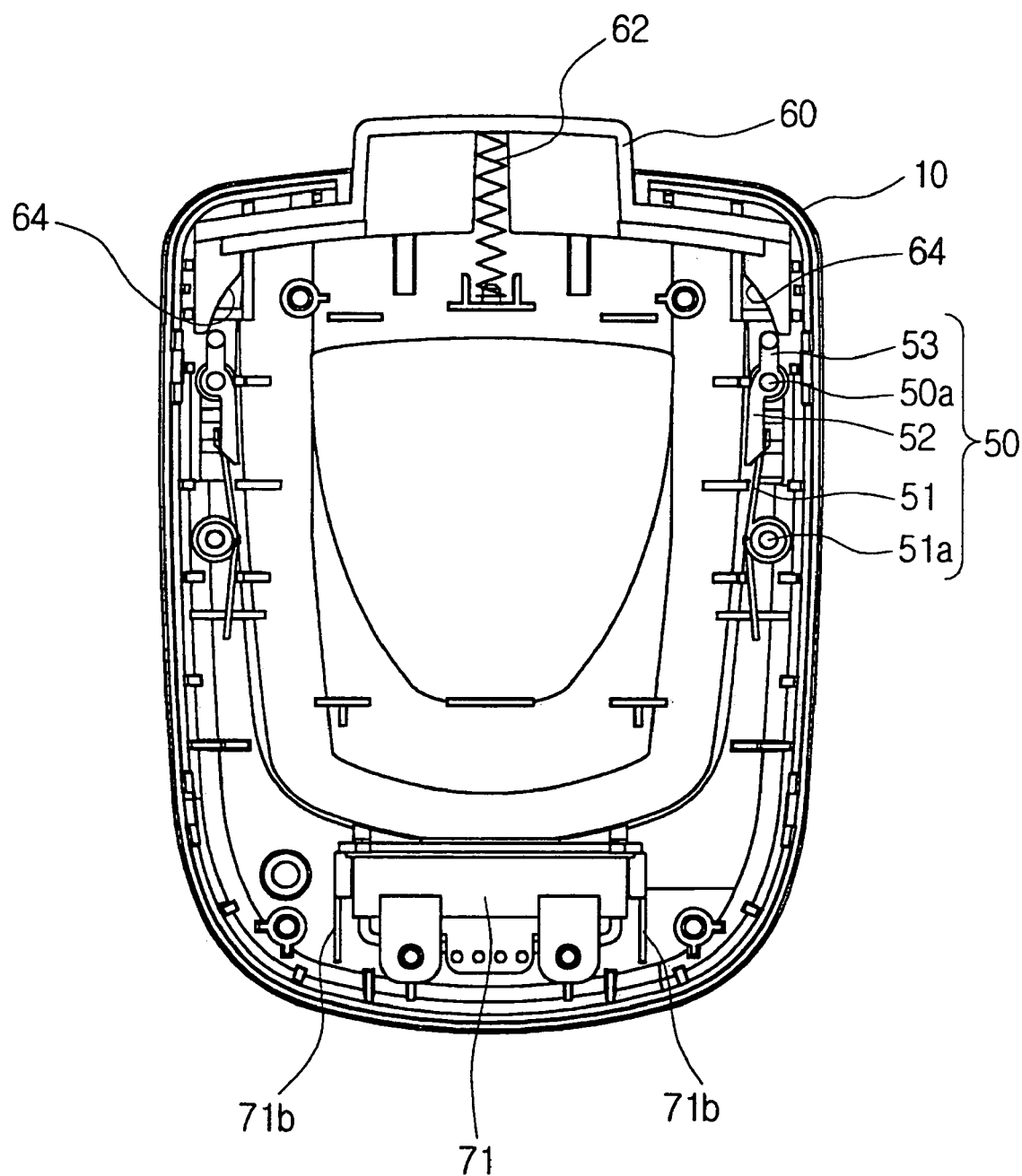
FIG. 12 is a view showing the portable charger for a mobile phone with a release button not operated and a rear housing removed therefrom.
Figure 13:
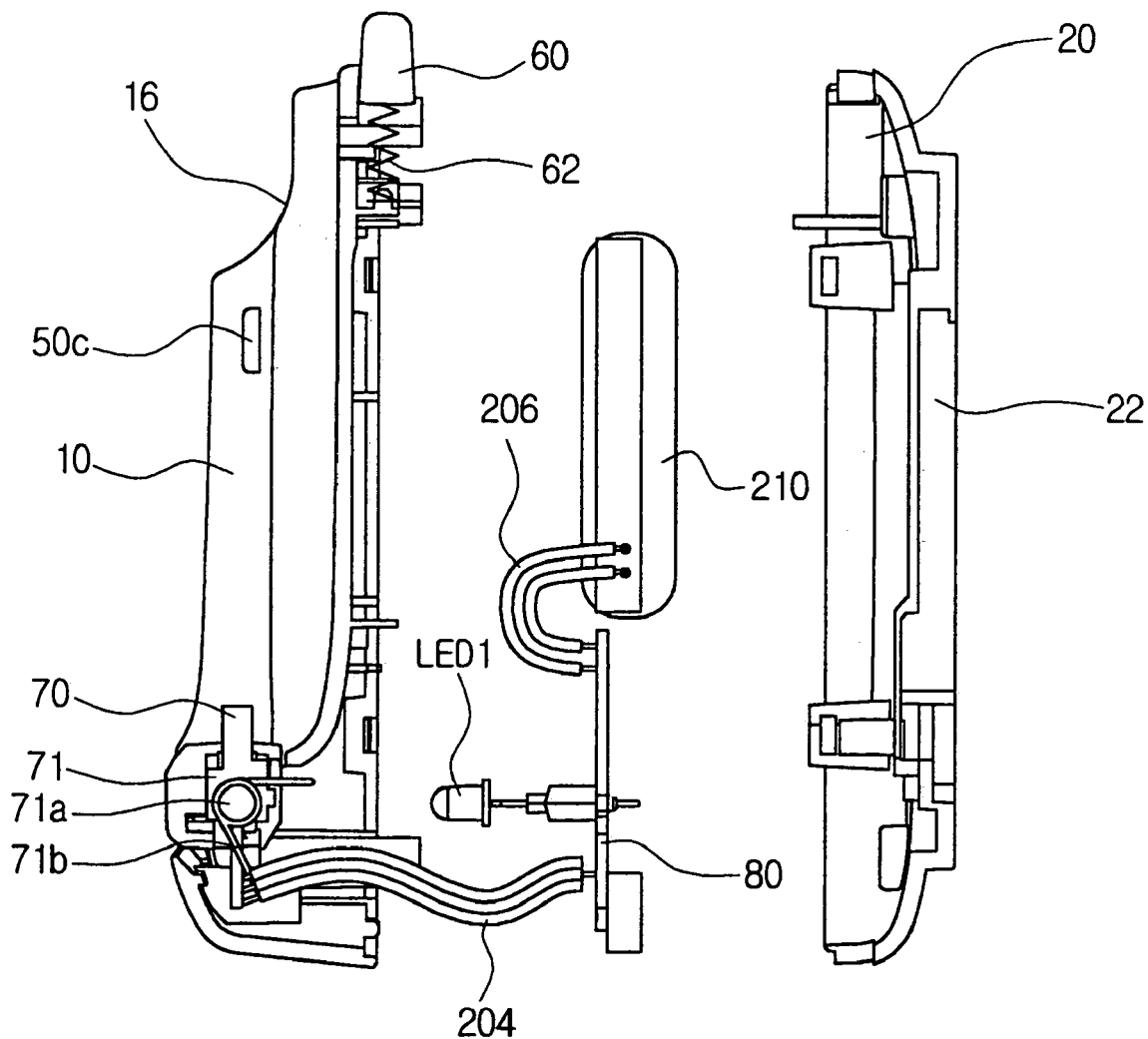
FIG. 13 is an exploded view of the portable charger for a mobile phone according to the embodiment of the present invention.
Figure 14:
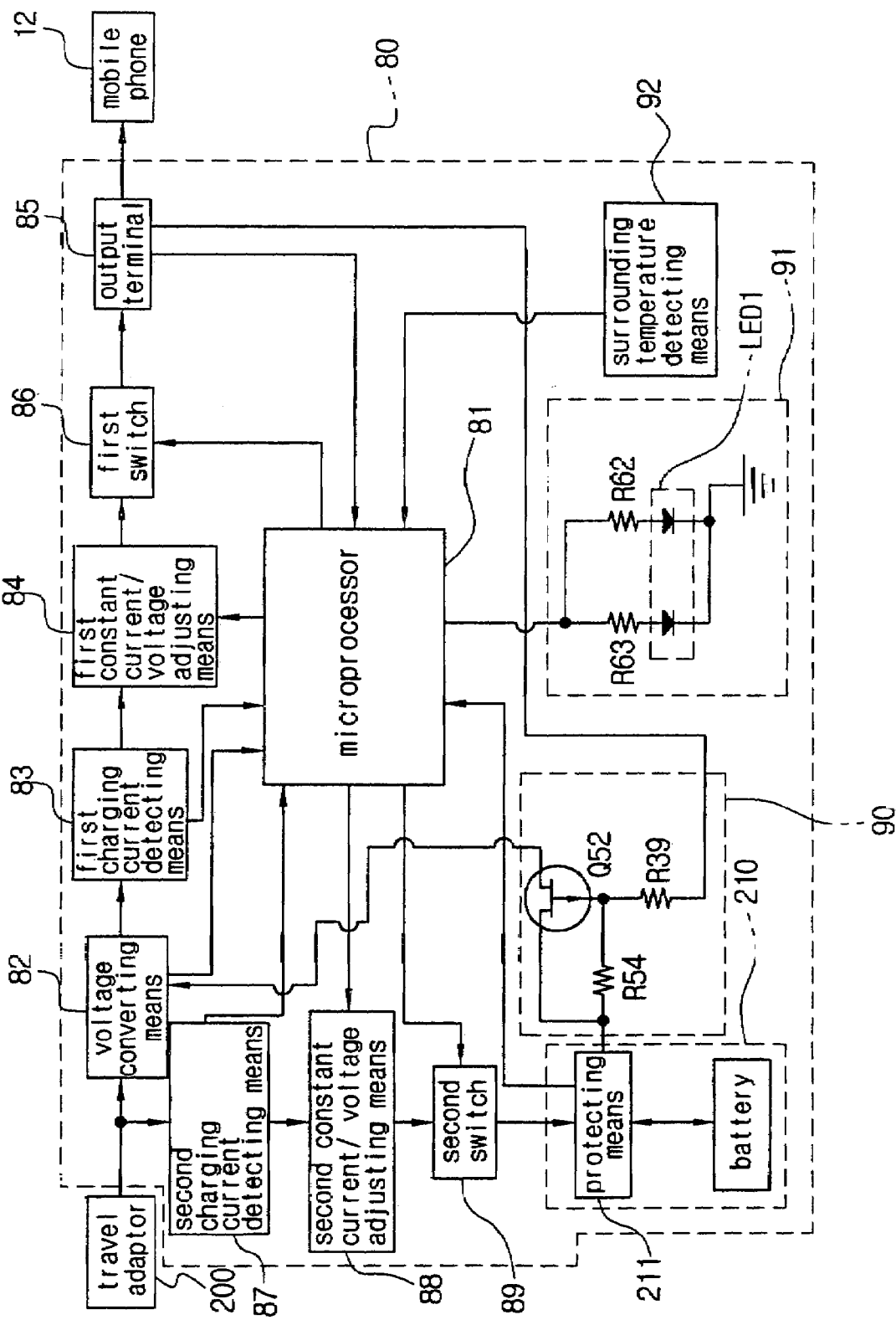
FIG. 14 is a block diagram showing the control unit of the portable charger for a mobile phone according to the embodiment of the present invention.

FIG. 3 is a front view schematically showing a portable charger for a mobile phone according to an embodiment of the present invention. FIG. 4 is a right side view showing the portable charger for a mobile phone with a belt clip in a non-operational position. FIG. 5 is a right side view showing the portable charger for a mobile phone with the belt clip in an operational position. FIG. 6 is a longitudinal section taken along line A—A of FIG. 3 with a secondary battery and a charge control circuit removed therefrom. FIG. 7 is a rearward perspective view showing the portable charger for a mobile phone with the belt clip separated therefrom. FIG. 8 is a rearward perspective view showing the portable charger for a mobile phone with a coupling member is separated from the fastening member of the belt clip. FIG. 9 is a view showing the coupling member rotated by 90° clockwise and counterclockwise around the fastening member of the belt clip in the portable charger for a mobile phone according to the embodiment of the present invention. FIG. 10 is a view showing the electrical connection of a charging cable to the portable charger for a mobile phone according to the embodiment of the present invention and the mounting of a mobile phone in the portable charger for a mobile phone according to the embodiment of the present invention. FIG. 11 is a view showing the mounting of a mobile phone in the portable charger for a mobile phone according to the embodiment of the present invention and the charging of the battery of the mobile phone using the secondary battery. FIG. 12 is a view showing the portable charger for a mobile phone with a release button not operated and a rear housing removed therefrom. FIG. 13 is an exploded view of the portable charger for a mobile phone according to the embodiment of the present invention. FIG. 14 is a block diagram showing the control unit of the portable charger for a mobile phone according to the embodiment of the present invention.

As shown in FIGS. 3 to 14, the portable charger 1000 for a mobile phone according to an embodiment of the present invention includes a front housing 10 having an accommodation recess 14 formed in the front side of the front housing 10 to accommodate a mobile phone 12, and cutouts 16 formed on the right and left sides of an upper portion of the accommodation recess 14 to allow a user to easily grip the mobile phone 12 seated in the accommodation recess 14 and easily manipulate the volume key (not shown) of the mobile phone 12; a rear housing 20 fastened to the back of the front housing 10 by screws 11 to close the rear open side of the front housing 10; a belt clip 30 detachably attached into a long accommodation recess 22 formed on a back of the rear housing 20 to change the mounting position of the rear housing 20; a fastening unit 40 placed in the long accommodation recess 22 formed on the back of the rear housing 20 to prevent the belt clip 30 from being removed from the accommodation recess 22; a pair of clamps 50 rotatably placed on the right and left sidewalls of the accommodation recess 14 formed in the front housing 10 to prevent the mobile phone 12 from being removed during charging while engaging with recesses (not shown) formed on both sides of the mobile phone 12, respectively; a release button 60 placed above a location between the front housing 10 and the rear housing 20 to regulate the protrusion and retraction of projections 50c of the clamps 50; an interface connector 70 mounted in the lower portion of the accommodation recess 14, formed in the front housing 10, through a shaft 71a and a coil spring 71b to be rotated in a block 71; a secondary battery 210 placed in a space formed by the front and rear housings 10 and 20; and a charge control unit 80 configured to perform control so that DC voltage, converted by a travel adaptor 200, is received through a cord 202 and a connector 208 and the second battery 210 and the battery of the mobile phone 12 are simultaneously charged with the DC voltage, or the battery of the mobile phone 12 is charged with DC voltage charged in the secondary battery 210.

The belt clip 30 includes a coupling member 31 having a pair of projections 31a formed on the top of the coupling member 31, and a recess 31c formed on the bottom of the coupling member 31 to engage with the projection 42 of the fastening unit 40, so that the coupling member 31, which is placed in the long accommodation recess 22 formed on the back of the rear housing 20, is fastened by the fastening unit 40; a rotating plate 32 having a pair of circular projections 32a and 32b configured to engage with a pair of depressions 31b formed on the circular projection 31d of the coupling member 31, and a coil spring 32d configured to push a catch 32c downward; a fastening member 33 integrated with the circular projection 31d of the coupling member 31 using ultrasonic fusion welding to accommodate the rotating plate 32 so that the rotating plate 32 can be rotated clockwise or counterclockwise; a moving member 34 mounted on the fastening member 33 to be rotated around a hinge pin 33a; and a coil spring 35 configured to push the front end (lower portion in FIG. 6) of the moving member 34 to the lower portion of the fastening member 33.

As shown in FIGS. 7 and 8, the fastening unit 40 includes a slider 41 configured to be pushed upward by a spring (not shown); a projection 42 integrally formed on the top of the slider 41 to prevent the removal of the belt clip 30 while engaging with the recess 31c formed on the bottom of the coupling member 31 of the belt clip 30; and a projection plate 43 integrally formed on the slider 41 to slide the slider 41 downward to detach the belt clip 30 from the rear housing 10.

As shown in FIGS. 10 to 12, the clamps 50 includes a pair of projections 50c placed on both sidewalls of the accommodation recess 14, formed in the front housing 10, to be selectively projected and retracted and to clamp the mobile phone 12 so as to prevent removal of the mobile phone 12 seated in the accommodation recess 14; a pair of coil springs 51 mounted on shafts 51a; a pair of lower actuating members 52 configured to be pushed inward by the coil spring 51 and protrude the projections 50c when the release button 60 is pulled; and a pair of upper actuating levers 53 mounted on hinge shafts 51a so that, when the release button 60 is pushed, the upper actuating levers 53 come into contact with an inclined surface 64 downwardly formed from the bottom of the release button 60 and are rotated outward, thus retracting the projections 50c.

The release button 60 is pushed by a coil spring 62 so that the projections 50c of the clamps 50 are pushed toward the accommodation recess 14 formed in the front housing 10.

As shown in FIG. 14, the charge control unit 80 includes a microprocessor 81 for controlling an entire operation relating to charge of the battery of the mobile phone 12 and the secondary battery 210; a voltage converting means 82 for receiving the DC power converted by the travel adaptor and the DC power (DC current and DC voltage) charged in the secondary battery 210, boosting or stepping down the DC power to charge the battery of the mobile phone 12, and outputting the boosted or stepped-down DC power to the microprocessor 81; first charging current detecting means 83 for receiving the DC power boosted or stepped-down by the voltage converting means 82, detecting charging current, and outputting the detected charging current to the microprocessor 81; first constant current/voltage adjusting means 84 for receiving the DC voltage boosted or stepped-down by the voltage converting means 82 and the charging current detected by the first charging current detecting means 83, performing operation on the DC voltage and the charging current through the microprocessor 81, and receiving the charging current detected by the first charging current detecting means 83 and adjusting the detected charging current to constant current and voltage in response to a control signal from the microprocessor 81 if the boosted or stepped-down voltage and the charging current are not constant current and voltage of a predetermined level; a first switch 86 for receiving the constant current/voltage adjusted by the first constant current/voltage adjusting means 84 and controlling the charge of the battery of the mobile phone 12 through an output terminal 85 in response to a control signal from the microprocessor 81; second charging current detecting means 87 for receiving the DC power (DC current and DC voltage) converted by the travel adaptor, and detecting charging current and outputting the detected charging current to the microprocessor 81 to charge the secondary battery 210; second constant current/voltage adjusting means 88 for receiving the charging current detected by the second charging current detecting means 87, performing operation on the charging current through the microprocessor 81, and receiving the charging current detected by the second charging current detecting means 83 and adjusting the detected charging current to constant current and voltage in response to a control signal from the microprocessor 81 if the charging current is not the constant current and voltage of a predetermined level; a second switch 89 for receiving the constant current/voltage adjusted by the second constant current/voltage adjusting means 88 and controlling charge of the secondary battery 210 in response to a control signal from the microprocessor 81; discharge preventing means 90 for performing control in such a way as to prevent the DC voltage charged in the secondary battery 210 if the battery of the mobile phone 12 is not connected to the output terminal 85, and to output the DC power charged in the secondary battery 210 to the voltage converting means 82 and charge the battery of the mobile phone 12 if the battery of the mobile phone 12 is connected to the output terminal 85; charge status display means 91 for displaying charge status of the battery of the mobile phone 12 and charge status of the secondary battery 210; and temperature detecting means 92 for detecting surrounding temperature and outputting the surrounding temperature to the microprocessor 81 to prevent charge of the battery of the mobile phone 12 and the secondary battery 210 under control of the microprocessor 81 if the surrounding temperature is above a predetermined temperature of about 45° C. or below a predetermined temperature of about −5° C.

The discharge preventing means 90 is composed of a field effect transistor Q5 that operates in such a way as to be switched on by application of low level voltage to a gate terminal through bias resistors R39 and R54 and output the DC power, charged in the secondary battery 210, to the voltage converting means 82 through protection means 211 if the battery of the mobile phone 12 is connected to the positive and negative electrodes of the output terminal 85, and to be switched off by application of high level voltage to a gate terminal through bias resistors R39 and R54 and charge the battery of the mobile terminal 12 if the battery of the mobile phone 12 is not connected to the positive and negative electrodes of the output terminal 85.

As described in FIGS. 10, 11, 13 and 14, the charge status display means 91 is a dual type light emission diode LED1, and the dual type light emission diode LED1 emits red light to indicate that the secondary battery 210 is being charged if the charge of the battery of the mobile phone 12 is completed, emits green light to indicate that the battery of the mobile phone 12 is being charged if the charge of the secondary battery 210 is completed, and does not emit light to indicate that the battery of the mobile phone 12 and the secondary battery 210 have been charged if the battery of the mobile phone 12 and the secondary battery 210 have been charged. In the charge status display means 91, R62 and R63 are current limiting resistors.

The temperature detecting means 92 is a temperature detecting sensor that detects surrounding temperature, and the secondary battery 210 is equipped with the protection means 211 that detects and filters out excessive current and voltage.

In the drawings, reference numeral 202 is a cord that connects the travel adaptor 200 and the connector 208, reference numeral 204 is wiring that electrically connects the interface connector 70 with the charge control unit 80.

The operation and effect of the portable charger for a mobile phone 1000 according to the embodiment of the present invention are described.

In order to charge the battery of the mobile phone 12 and the secondary battery 210 seated in the portable charger for a mobile phone 1000 according to the embodiment of the present invention, the user, as shown in FIGS. 10 and 11, connects a charge terminal (not shown), which is formed in the lower portion of the mobile phone, to the interface connector 70 while seating the mobile phone 12 into the accommodation recess 14.

At this time, the projections 50c of the clamps 50 are engaged with the recesses formed on both sides of the mobile phone 12, so that the mobile phone 12 is prevented from the portable charger for a mobile phone 1000. In other words, when the projections 50c of the clamps 50 mounted on both sidewalls of the accommodation recess 14 formed in the front housing 10 are engaged with the recesses formed on both sides of the mobile phone 12, the lower actuating levers 52 constituting the lower portions of the clamps 50 are rotated counterclockwise around the hinge shafts 50a against the coil springs 51 and the upper actuating levers 53 of the clamps 50 are also rotated around the hinge shafts 50a, so that the mobile phone 12 can be easily fitted into the accommodation recess 14.

When the mobile phone 12 is completely seated in the accommodation access 14 formed in the front housing 10, the upper actuating levers 53 and the lower actuating levers 52 are rotated around the hinge shafts 50a clockwise by the elastic force of the coil springs 51. At this time, the projections 50c of the clamps 50 are engaged with the recesses formed on both sides of the mobile phone 12, so that the mobile phone 12 is firmly secured in the portable charger for a mobile phone 1000.

When the mobile phone 12 is seated in the accommodation recess 14 of the front housing 10 of the portable charger for a mobile phone 1000, the connector 208 attached to one end of the cord 202 is electrically connected to the charging connector (not shown) mounted in the portable charger for a mobile phone 1000, and then the plug 200a of the travel adaptor 200 attached to the other end of the cord 202 is connected to a 110 or 220 Vac outlet, the travel adaptor 200 receives 110 or 220 Vac, converts the received power into DC voltage and supplies the DC voltage to the charge control unit 80.

Accordingly, the battery of the mobile phone 12 and the secondary battery 210 are charged with the DC voltage under the control of the charge control unit 80, so that a dual type Light Emitting Diode (LED) LED1 emits orange light.

Meanwhile, if the battery of the mobile phone 12 has been charged during charging first, the dual type LED LED1 emits red light, thus indicating that the secondary battery 210 is being charged. If the secondary battery 210 has been charged during charging first, the dual type LED LED1 emits green light, thus indicating that the battery of the mobile phone 12 is being charged. If both of the battery of the mobile phone 12 and the secondary battery 210 have been charged, the dual type LED LED1 does not emit light, thus indicating that both of the battery of the mobile phone 12 and the secondary battery 210 have been charged.

When the battery of the mobile phone 12 and the secondary battery 210 have been charged, the projections 50c of the clamps 50 are retracted by pushing the release button 60 of the portable charger for a mobile phone, so that the user can make calls while carrying the mobile phone 12 separated from the portable charger for a mobile phone 1000.

An operation of retracting the projections 50c of the clamps 50 is illustrated in FIG. 12. When the release button 12 is pushed, the release button 12 is lowered while pushing the coil springs 62. Accordingly, the inclined surface 64 formed on the lower part of the release button 60 rotates the upper actuating levers 53 of the clamps 50 around the hinge shafts 50*a* counterclockwise, so that the lower actuating levers 52 are rotated around the shafts 51*a* counterclockwise against the elastic force of the coil springs 51. As a result, the projections 50*c* of the clamps 50 are inserted into the front housing 10, so that the mobile phone 12 can be easily separated from the portable charger for a mobile phone 1000.

When the lower portion of the moving member 34 is taken away from the fastening member 33 by pushing the moving member 34 of the belt clip 30, the moving member 3 is released from being pushed while the waist belt (not shown) remains positioned between the fastening member 33 and the moving member 34. Accordingly, the moving member 34 clamps the waist belt due to the elastic force of the coil springs 35, so that the belt clip 30 is fastened to the waist belt.

If the user feels inconvenience when the user sits or bends the user's back while wearing the portable charger for a mobile phone 1000 on a waist belt, the rotating plate 32 of the belt clip 30 is rotated in the accommodating recess (not shown), which is formed in the fastening member 33, by rotating the portable charger for a mobile phone 1000 a specific angle (for example, 30° or 90°) clockwise or counterclockwise.

At this time, the catch 32*c* placed on the rotating plate 32 of the belt clip 30 is rotated while pushing the coil spring 32*d*, and the front end of the catch 32*c* is fitted into the recess 33*b* formed in the inside wall of the accommodation recess of the fastening member 33. When the catch 32*c* is rotated further, the catch 32*c* can be rotated by 90° clockwise or counterclockwise. Accordingly, the assembly of the front housing 10 and the rear housing 20 of the portable charger for a mobile phone 1000 according to the embodiment of the present invention can be located along the length of the waist belt, so that the portable charger for a mobile phone 1000 is easy to carry.

When the battery of the mobile phone 12 is discharged after the use of the mobile phone 12, and the secondary battery 210 is discharged after charging the battery of the mobile phone 12 with the DC power charged in the secondary battery 210, the mobile phone 12 is seated in the accommodation recess 14 formed in the front housing 10 of the portable charger for a mobile phone 1000. Moreover, the charging terminal (not shown) formed on the lower portion of the mobile phone 12 is connected to the interface connector 70, the connector 208 placed on one side of the cord 202 is electrically connected to the charging connector (not shown) placed in the portable charger for a mobile phone 1000, and the plug 200*a* of the travel adaptor 200 placed on the other end of the cord 202 is connected to the 110 or 220 Vac outlet, so that the battery of the mobile phone 12 and the secondary battery 210 are charged under the control of the charge control unit 80.

An operation of charging the charge control unit 80 is described in detail below.

The DC power obtained by the travel adaptor 200 is boosted or stepped-down by the voltage converting means 82, and the boosted or stepped-down DC power is output both to the microprocessor 81 and to the first charging current detecting means 83.

The first charging current detecting means 83 receives the DC current boosted or stepped-down by the voltage converting means 82, detects charging current, and outputs the detected charging current both to the microprocessor 81 and to the first constant current/voltage adjusting means 84. The microprocessor 81 receives the DC voltage boosted or stepped-down by the voltage converting means 82 and the charging current detected by the first charging current detecting means 83, and performs operation on the DC voltage and the charging current. If the DC voltage and the charging current are not constant voltage and current of a predetermined level that is required for the charge of the battery of the mobile phone 12, the microprocessor 81 outputs a control signal to the first constant current/voltage adjusting means 84, and the first constant current/voltage adjusting means 84 adjusts the DC voltage and the charging current to constant voltage and current of a predetermined level required for the charge of the battery of the mobile phone 12 and outputs the adjusted current and voltage to the first switch 86.

The first switch 86 receives a control signal, which instructs the first switch 86 to charge the battery of the mobile phone 12, from the microprocessor 81, is switched on, and then charges the battery of the mobile phone 12 through the positive and negative electrodes of the output terminal 85.

At the same time, the second charging current detecting means 87 receives the DC power obtained by the travel adaptor 200, detects charging current, and outputs the charging current both to the microprocessor 81 and to the second constant current/voltage adjusting means 88. The microprocessor 81 receives the charging current detected by the second charging current detecting means 87 and performs operation on the charging current. If the charging current is not constant current and voltage of a predetermined level that is required for the charge of the secondary battery 210, the microprocessor 81 outputs a constant current/voltage adjusting control signal to the second constant current/voltage adjusting means 88. The second constant current/voltage adjusting means 88 adjusts the charging current to the constant current and voltage of a predetermined level that is required for the charge of the secondary battery 210, and outputs the constant current and voltage to the second switch 89.

In this case, the second switch 89 is switched on in response to the control signal from the microprocessor 81, and charges the secondary battery 210 with the constant voltage and current adjusted by the second constant current/voltage adjusting means 87, with excessive voltage and current being detected and filtered out by the protection means 211 mounted in the secondary battery 210.

An operation of charging the battery of the mobile phone 12 with the DC current charged in the secondary battery 210.

In order to charge the battery of the mobile phone 12 with the DC power charged in the secondary battery 210 when the battery of the mobile phone 12 is discharged after the user of the mobile phone 12, the mobile phone 12 is seated in the accommodation recess 14 of the front housing 10.

In this case, since the battery of the mobile phone 12 is connected to the output terminal 85 as the charging terminal (not shown) placed on the lower portion of the mobile phone 12 comes into contact with the interface connector 70, voltage of a low level is applied to the gate terminal of the field effect transistor Q52 through the bias resistors R39 and R54. Accordingly, the field effect transistor Q52 is switched on, so that the DC current charged in the secondary battery 210 is output to the voltage converting means 82 through the protection means 211.

The voltage converting means 82 receives the DC power charged in the secondary battery 210 through the protecting means 211 and the discharge preventing means 90, boosts or steps down the DC voltage to charge the battery of the mobile phone 12, and outputs the boosted or stepped-down DC voltage both to the microprocessor 81 and to the first charging current detecting means 83. The charging current detected by the first charging current detecting means 83 is output both to the microprocessor 81 and to the first constant current/voltage adjusting means 84.

Accordingly, the microprocessor 81 receives the DC voltage boosted or stepped-down by the voltage converting means 82 and the charging current detected by the first charging current detecting means 83, and performs operation on the boosted or stepped-down voltage and the charging current. If the boosted or stepped-down voltage and the charging current are not constant voltage or current of a predetermined level that is required for the charge of the battery of the mobile phone 12, the microprocessor 81 outputs a constant current/voltage control signal to the first constant current/voltage adjusting means 84, and the first constant current/voltage adjusting means 84 adjusts the boosted or stepped-down voltage and the charging current to constant current and voltage of a predetermined level that is required for the charge of the battery of the mobile phone 12, and outputs the adjusted voltage and current to the first switch 86.

The first switch 86 receives a control signal, which instructs the first switch 86 to charge the battery of the mobile phone 12, from the microprocessor 81, is switched on, and charges the battery of the mobile phone 12 through the positive and negative electrodes of the output terminal 85.

Meanwhile, if the battery of the mobile phone 12 is not connected to the output terminal 85, voltage of a high level is applied to the gate terminal of the field effect transistor Q52 through the bias resistors R39 and R54 and the field effect transistor Q52 is switched off, so that the natural discharge of the DC power charged in the secondary battery 210 is prevented.

Figure 15:
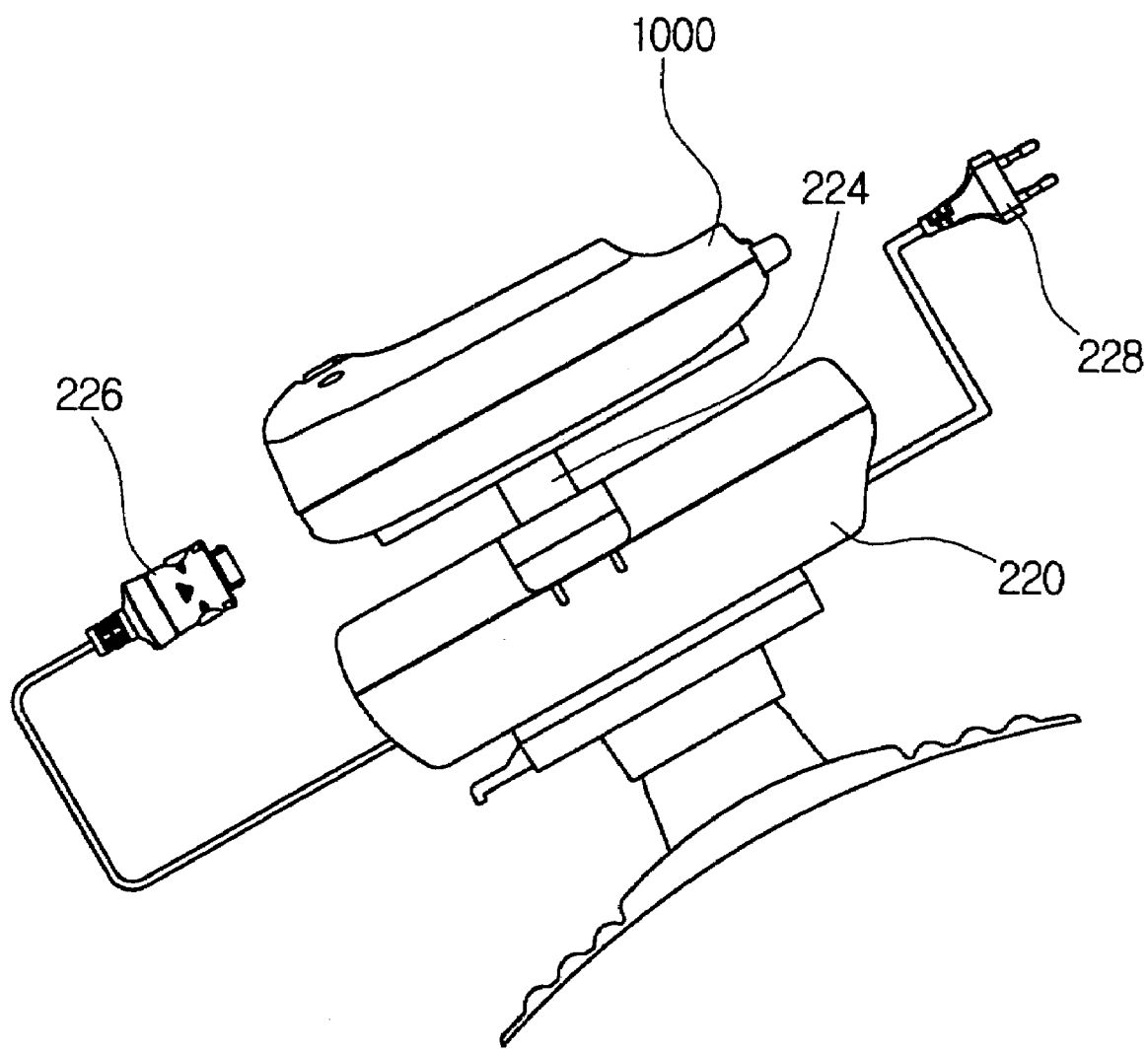
FIG. 15 is a view showing the portable charger for a mobile phone that is being charged while remaining combined with a hands-free kit for an automobile.
Figure 16:
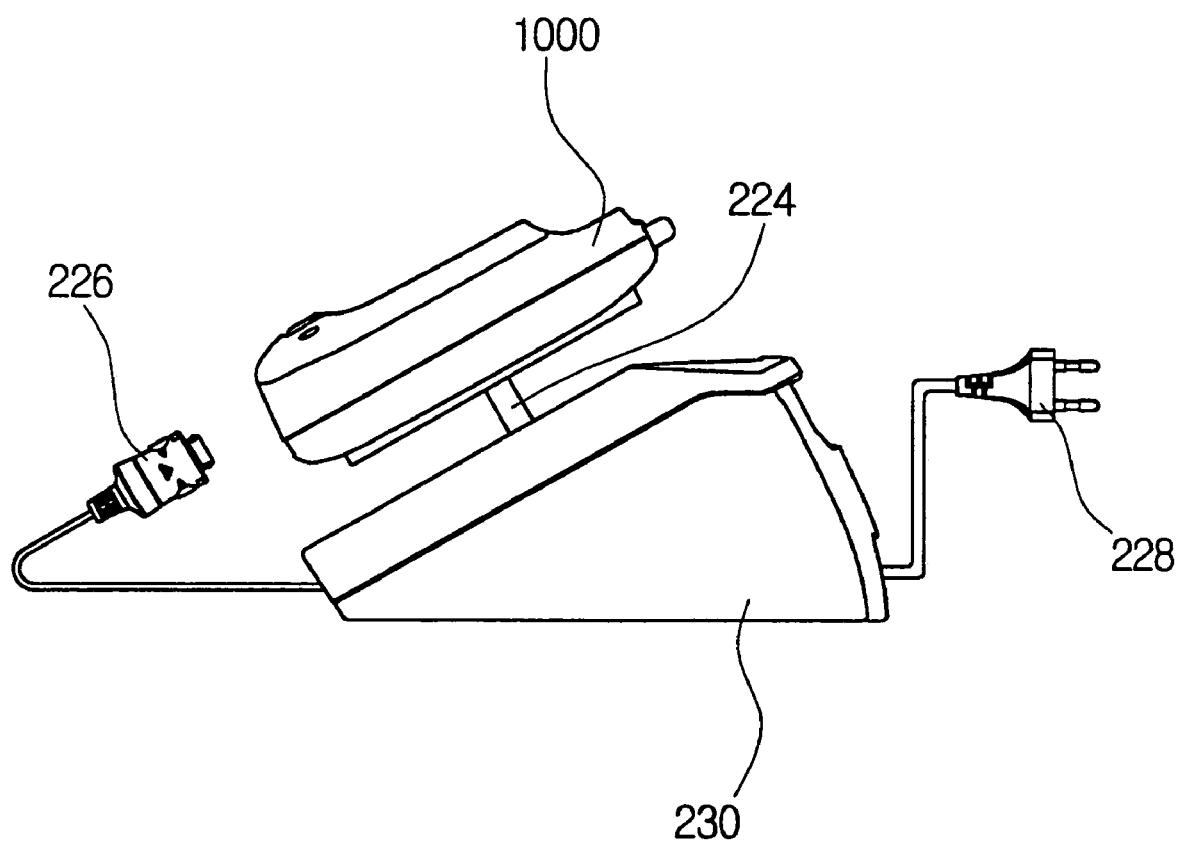
FIG. 16 is a view showing the portable charger for a mobile phone that is being charged while remaining mounted on a table charging stand.

FIG. 15 is a view showing the portable charger for a mobile phone 1000 that is being charged while remaining combined with a hands-free kit for an automobile. FIG. 16 is a view showing the portable charger for a mobile phone 1000 that is being charged while remaining mounted on a table charging stand.

As shown in FIGS. 15 and 16, after the belt clip 30 detachably attached to the back of the portable charger for a mobile phone 1000 is separated from the portable charger for a mobile phone 1000 and the accommodation recess 22 formed in the back of the rear housing 100 of the portable charger for a mobile phone 1000 is connected to the hands-free kit 220 or table charging stand 230 using a bracket 224, the mobile phone 12 is seated in the accommodation recess 14 by pushing the mobile phone 12 into the accommodation recess 14 formed in the front of the front housing 10.

Thereafter, after a connector 226 connected to the hands-free kit 220 or the table charging stand 230 is connected to the charging connector of the portable charger for a mobile phone 1000, and the hands-free kit 220 or the plug 228 of the table charging stand 230 is connected to an automobile battery or 110 or 220 Vac outlet, the battery of the mobile phone 12 or the secondary battery 210 contained in the portable charger for a mobile phone according to an embodiment of the present invention is charged.

The attachment and detachment of the belt clip 30 detachably attached to the accommodation recess 22 formed in the back of the portable charger for a mobile phone 1000, that is, the back of the rear housing 20, is described below.

In order to detach the belt clip 30 from the accommodation recess 22 formed in the back of the rear housing of the portable charger for a mobile phone 1000, the projection plate 43 integrated with the slider 41 of the fastening unit 40 is pushed downward. At this time, the slider 41 of the fastening member 40 is pushed downward while compressing a spring (not shown), and then the projection 42 integrated with the front end of the slider 41 is removed from the recess 31c formed in the lower portion of the coupling member 31 of the belt clip 30.

In this case, when the fastening member 33 and moving member 34 of the belt clip 30 is pushed downward or pulled, the pair of projections 31a integrated with the upper end of the coupling member 31 is removed from the accommodation recess (not shown) formed in the back of the rear housing 20 and the belt clip 30, which is fitted into the accommodation recess 22 formed in the back of the rear housing 20 of the portable charger for a mobile phone 1000, is separated from the portable charger for a mobile phone 1000.

In order to fit the belt clip 30 into the accommodation recess 22 formed in the back of the rear housing 20 of the portable charger for a mobile phone 1000, after the projection plate 43 integrated with the upper portion of the slider 41 is pushed downward, the pair of projections 31a integrated with the upper end of the belt clip 30 is pushed into the accommodation recess formed in the upper portion of the back of the rear housing 20, and the fastening member 33 and moving member 34 of the belt clip 30 are pushed into the accommodation recess 22 formed in the back of the rear housing 20.

When the grip of the projection plate 43 integrated with the slider 41 of the fastening member 40 is released, the slider 41 is moved upward by the elastic force of a spring (or elastic member; not shown) and the projection 42 integrally formed at the upper end of the slider 41 is fitted into the recess 31c formed at the lower end of the coupling member 31, so that the coupling member 31 of the belt clip 30 is securely fitted into the accommodation recess 22 of the rear housing 20.

Consequently, in accordance with the present invention, the portable charger for a mobile phone 1000 can be worn on a waist belt using the belt clip, the wearing position of the portable charger for a mobile phone 1000 can be changed through the rotation thereof in the case of being worn on a waist belt, the secondary battery 210 and the battery of the mobile phone 12 can be charged with the DC power obtained by the travel adaptor 200 at the same time, and the charging power of the secondary battery 210 can be prevented from be discharged by turning off the discharge preventing means 90 in the case where the mobile phone 12 is not electrically connected to the accommodation recess 14 of the front housing 10 of the portable charger for a mobile phone 1000.

Furthermore, in accordance with the present invention, charge can be prevented in the case where the surrounding temperature is equal to or higher than a predetermined temperature (about 45° C.) or lower than a predetermined temperature (about −5° C.), the battery of the mobile phone can be charged with the DC power charged in the secondary battery 210 in a temperature range of about −5° C. to 45° C., the portable charger for a mobile phone 1000 can easily charge the battery of the mobile phone 12 using the automobile battery while connecting to the hands-free kit 220, and the portable charger for a mobile phone 1000 can simultaneously charge the secondary battery 210 and the battery of the mobile phone 12 while electrically connecting to the table charging stand 230.

Although in the above description, the case where the portable charger for a mobile phone is worn on the waist belt has been described as an example, the present invention is not limited to this case, but the portable charger for a mobile phone may be worn on the edge of a jacket or edge of a pocket of a trouser.

Furthermore, although in the above description, the case where the battery, along with the mobile phone 12, is seated in the accommodation recess 14 of the front housing 10 and is charged with power has been described, the present invention is not limited to this case, but only the battery may be seated in the accommodation recess 14 and be charged with power.

As described above, in accordance with the present invention, the portable charger for a mobile phone can be easily worn on a waist belt using the belt clip, the wearing position of the portable charger for a mobile phone can be changed through the rotation thereof in the case of being worn on a waist belt, the secondary battery and the battery of the mobile phone can be charged with the DC power obtained by the travel adaptor at the same time, the charging power of the secondary battery can be prevented from being discharged by turning off the discharge preventing means in the case where the mobile phone is not electrically connected to the accommodation recess of the front housing of the portable charger for a mobile phone, charge can be prevented in the case where the surrounding temperature is equal to or higher than a predetermined temperature (about 45° C.) or lower than a predetermined temperature (about −5° C.), the battery of the mobile phone can be easily charged with the DC voltage charged in the secondary battery, the portable charger for a mobile phone can easily charge the battery of the mobile phone using the automobile battery while connecting to the hands-free kit, and the portable charger for a mobile phone can simultaneously charge the secondary battery and the battery of the mobile phone while electrically connecting to the table charging stand.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A portable charger for a mobile phone, comprising:
    a front housing having an accommodation recess formed in a front side of the front housing to accommodate a mobile phone, and cutouts formed on right and left sides of an upper portion of the accommodation recess to allow a user to easily grip the mobile phone seated in the accommodation recess and easily manipulate a volume key of the mobile phone;
    a rear housing fastened to a back of the front housing by screws to close a rear open side of the front housing;
    a belt clip detachably attached into a long accommodation recess formed on a back of the rear housing to change a mounting position of the rear housing;
    a fastening unit placed in the long accommodation recess formed on the back of the rear housing to prevent the belt clip from being removed from the accommodation recess;
    a pair of clamps rotatably placed on right and left sidewalls of the accommodation recess formed in the front housing to prevent the mobile phone from being removed during charging while engaging with recesses formed on both sides of the mobile phone, respectively;
    a release button placed above a location between the front housing and the rear housing to regulate protrusion and retraction of projections of the clamps;
    an interface connector mounted in a lower portion of the accommodation recess, formed in the front housing, through a shaft and a coil spring to be rotated in a block;
    a secondary battery placed in a space formed by the front and rear housings; and
    a charge control unit configured to perform control so that Direct Current (DC) voltage, converted by a travel adaptor, is received through a cord and a connector and the second battery and the battery of the mobile phone are simultaneously charged with the DC voltage, or the battery of the mobile phone is charged with DC voltage charged in the secondary battery.

2. The portable charger for a mobile phone as set forth in claim 1, wherein the belt clip comprises:
    a coupling member having a pair of projections formed on a top of the coupling member, and a recess formed on a bottom of the coupling member to engage with a projection of the fastening unit, so that the coupling member, which is placed in the long accommodation recess formed on the back of the rear housing, is fastened by the fastening unit;
    a rotating plate having a pair of circular projections configured- to engage with a pair of depressions formed on a circular projection of the coupling member, and a coil spring configured to push a catch downward;
    a fastening member integrated with the circular projection of the coupling member using ultrasonic fusion welding to accommodate the rotating plate so that the rotating plate can be rotated clockwise or counterclockwise;
    a moving member mounted on the fastening member to be rotated around a hinge pin; and
    a coil spring configured to push a low portion of the moving member to a lower portion of the fastening member.

3. The portable charger for a mobile phone as set forth in claim 1, wherein the fastening unit comprises:
    a slider configured to be pushed upward by a spring;
    a projection integrally formed on a top of the slider to prevent removal of the belt clip while engaging with the recess formed on the bottom of the coupling member of the belt clip; and
    a projection plate integrally formed on the slider to slide the slider downward to detach the belt clip from the rear housing.

4. The portable charger for a mobile phone as set forth in claim 1, wherein the clamps comprise:
    a pair of projections placed on both sidewalls of the accommodation recess, formed in the front housing, to be selectively projected and retracted and to clamp the mobile phone so as to prevent removal of the mobile phone seated in the accommodation recess;
    a pair of coil springs mounted on shafts;
    a pair of lower actuating members configured to be pushed inward by the coil spring and protrude the projections when the release button is pulled; and
    a pair of upper actuating levers mounted on hinge shafts so that, when the release button is pushed, the upper actuating levers come into contact with an inclined surface downwardly formed from the bottom of the release button and are rotated outward, thus retracting the projections.

5. The portable charger for a mobile phone as set forth in claim 1, wherein the release button is pushed by a coil spring so that the projections of the clamps are pushed toward the accommodation recess formed in the front housing.

6. The portable charger for a mobile phone as set forth in claim 1, wherein the charge control unit comprises:

a microprocessor for controlling an entire operation relating to charge of the battery of the mobile phone and the secondary battery;

voltage converting means for receiving the DC power converted by the travel adaptor and the DC power (DC current and DC voltage) charged in the secondary battery, boosting or stepping down the DC power to charge the battery of the mobile phone, and outputting the boosted or stepped-down DC power to the microprocessor;

first charging current detecting means for receiving the DC power boosted or stepped-down by the voltage converting means, detecting charging current, and outputting the detected charging current to the microprocessor;

first constant current/voltage adjusting means for receiving the DC voltage boosted or stepped-down by the voltage converting means and the charging current detected by the first charging current detecting means, performing operation on the DC voltage and the charging current through the microprocessor, and receiving the charging current detected by the first charging current detecting means and adjusting the detected charging current to constant current and voltage in response to a control signal from the microprocessor if the boosted or stepped-down voltage and the charging current are not constant current and voltage of a predetermined level;

a first switch for receiving the constant current/voltage adjusted by the first constant current/voltage adjusting means and controlling charge of the battery of the mobile phone through an output terminal in response to a control signal from the microprocessor;

second charging current detecting means for receiving the DC power (DC current and DC voltage) converted by the travel adaptor, and detecting charging current and outputting the detected charging current to the microprocessor to charge the secondary battery;

second constant current/voltage adjusting means for receiving the charging current detected by the second charging current detecting means, performing operation on the charging current through the microprocessor, and receiving the charging current detected by the second charging current detecting means and adjusting the detected charging current to constant current and voltage in response to a control signal from the microprocessor if the charging current is not constant current and voltage of a predetermined level;

a second switch for receiving the constant current/voltage adjusted by the second constant current/voltage adjusting means and controlling the charge of the secondary battery in response to a control signal from the microprocessor;

discharge preventing means for performing control in such a way as to prevent the DC voltage charged in the secondary battery if the battery of the mobile phone is not connected to the output terminal, and to output the DC power charged in the secondary battery to the voltage converting means and charge the battery of the mobile phone if the battery of the mobile phone is connected to the output terminal;

charge status display means for displaying charge status of the battery of the mobile phone and charge status of the secondary battery; and temperature detecting means for detecting surrounding temperature and outputting the surrounding temperature to the microprocessor to prevent charge of the battery of the mobile phone and the secondary battery under control of the microprocessor if the surrounding temperature is above a predetermined temperature of about 45° C. or below a predetermined temperature of about −5° C.

7. The portable charger for a mobile phone as set forth in claim 6, wherein the discharge preventing means is composed of a field effect transistor that operates in such a way as to be switched on by application of low level voltage to a gate terminal through bias resistors and output the DC power, charged in the secondary battery, to the voltage converting means through protection means if the battery of the mobile phone is connected to positive and negative electrodes of the output terminal, and to be switched off by application of high level voltage to a gate terminal through bias resistors and charge the battery of the mobile terminal if the battery of the mobile phone is not connected to the positive and negative electrodes of the output terminal.

8. The portable charger for a mobile phone as set forth in claim 6, wherein the charge status display means is a dual type light emission diode, and the dual type light emission diode emits red light to indicate that the secondary battery is being charged if the charge of the battery of the mobile phone is completed, emits green light to indicate that the battery of the mobile phone is being charged if the charge of the secondary battery is completed, and does not emit light to indicate that the battery of the mobile phone and the secondary battery have been charged if the battery of the mobile phone and the secondary battery have been charged.

9. A portable charger for a mobile phone, comprising:

a front housing having an accommodation recess formed in a front side of the front housing to accommodate a mobile phone, and cutouts formed on right and left sides of an upper portion of the accommodation recess to allow a user to easily grip the mobile phone seated in the accommodation recess and easily manipulate a volume key of the mobile phone;

a rear housing fastened to a back of the front housing by screws to close a rear open side of the front housing;

a belt clip detachably attached into a long accommodation recess formed on a back of the rear housing to change a mounting position of the rear housing;

a fastening unit placed in the long accommodation recess formed on the back of the rear housing to prevent the belt clip from being removed from the accommodation recess;

a pair of clamps rotatably placed on right and left sidewalls of the accommodation recess formed in the front housing to prevent the mobile phone from being removed during charging while engaging with recesses formed on both sides of the mobile phone, respectively;

a release button placed above a location between the front housing and the rear housing to regulate protrusion and retraction of projections of the clamps;

an interface connector mounted in a lower portion of the accommodation recess, formed in the front housing, through a shaft and a coil spring to be rotated in a block; and a secondary battery placed in a space formed by the front and rear housings to be charged with DC voltage, obtained by a travel adaptor, under control of a charge control unit.

10. A charge control unit for a mobile phone portable charger comprising:

a microprocessor for controlling an entire operation relating to charge of a battery of the mobile phone and a secondary battery associated with the portable charger;

voltage converting means for receiving DC power converted by a travel adaptor and DC power (DC current and DC voltage) charged in the secondary battery, boosting or stepping down the DC power to charge the battery of the mobile phone, and outputting the boosted or stepped-down DC power to the microprocessor;

first charging current detecting means for receiving the DC power boosted or stepped-down by the voltage converting means, detecting charging current, and outputting the detected charging current to the microprocessor;

first constant current/voltage adjusting means for receiving the DC voltage boosted or stepped-down by the voltage converting means and the charging current detected by the first charging current detecting means, performing operation on the DC voltage and the charging current through the microprocessor, and receiving the charging current detected by the first charging current detecting means and adjusting the detected charging current to constant current and voltage in response to a control signal from the microprocessor if the boosted or stepped-down voltage and the charging current are not constant current and voltage of a predetermined level;

a first switch for receiving the constant current/voltage adjusted by the first constant current/voltage adjusting means and controlling charge of the battery of the mobile phone through an output terminal in response to a control signal from the microprocessor;

second charging current detecting means for receiving the DC power (DC current and DC voltage) converted by the travel adaptor, and detecting charging current and outputting the detected charging current to the microprocessor to charge the secondary battery;

second constant current/voltage adjusting means for receiving the charging current detected by the second charging current detecting means, performing operation on the charging current through the microprocessor, and receiving the charging current detected by the second charging current detecting means and adjusting the detected charging current to constant current and voltage in response to a control signal from the microprocessor if the charging current is not constant current and voltage of a predetermined level;

a second switch for receiving the constant current/voltage adjusted by the second constant current/voltage adjusting means and controlling the charge of the secondary battery in response to a control signal from the microprocessor;

discharge preventing means for performing control in such a way as to prevent the DC voltage charged in the secondary battery if the battery of the mobile phone is not connected to the output terminal, and to output the DC power charged in the secondary battery to the voltage converting means and charge the battery of the mobile phone if the battery of the mobile phone is connected to the output terminal;

charge status display means for displaying charge status of the battery of the mobile phone and charge status of the secondary battery; and temperature detecting means for detecting surrounding temperature and outputting the surrounding temperature to the microprocessor to prevent charge of the battery of the mobile phone and the secondary battery under control of the microprocessor if the surrounding temperature is above a predetermined temperature of about 45° C. or below a predetermined temperature of about −5° C.

11. A charge control unit as set forth in claim 10, wherein the discharge preventing means is composed of a field effect transistor that operates in such a way as to be switched on by application of low level voltage to a gate terminal through bias resistors and output the DC power, charged in the secondary battery, to the voltage converting means through protection means if the battery of the mobile phone is connected to positive and negative electrodes of the output terminal, and to be switched off by application of high level voltage to a gate terminal through bias resistors and charge the battery of the mobile terminal if the battery of the mobile phone is not connected to the positive and negative electrodes of the output terminal.

12. A charge control unit as set forth in claim 10, wherein the charge status display means is a dual type light emission diode, and the dual type light emission diode emits red light to indicate that the secondary battery is being charged if the charge of the battery of the mobile phone is completed, emits green light to indicate that the battery of the mobile phone is being charged if the charge of the secondary battery is completed, and does not emit light to indicate that the battery of the mobile phone and the secondary battery have been charged if the battery of the mobile phone and the secondary battery have been charged.

* * * * *